US012593034B2

(12) United States Patent
Jhu et al.

(10) Patent No.: US 12,593,034 B2
(45) Date of Patent: Mar. 31, 2026

(54) METHODS AND DEVICES FOR DECODER-SIDE INTRA MODE DERIVATION

(71) Applicant: BEIJING DAJIA INTERNET INFORMATION TECHNOLOGY CO., LTD., Beijing (CN)

(72) Inventors: Hong-Jheng Jhu, San Diego, CA (US); Xiaoyu Xiu, San Diego, CA (US); Yi-Wen Chen, San Diego, CA (US); Wei Chen, San Diego, CA (US); Che-Wei Kuo, San Diego, CA (US); Ning Yan, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/616,074

(22) Filed: Mar. 25, 2024

(65) Prior Publication Data

US 2024/0244192 A1 Jul. 18, 2024

Related U.S. Application Data

(63) Continuation of application No. PCT/US2022/045279, filed on Sep. 29, 2022.
(Continued)

(51) Int. Cl.
H04N 9/11 (2006.01)
H04N 19/105 (2014.01)
(Continued)

(52) U.S. Cl.
CPC ........... H04N 19/11 (2014.11); H04N 19/105 (2014.11); H04N 19/132 (2014.11);
(Continued)

(58) Field of Classification Search
CPC .... H04N 19/11; H04N 19/105; H04N 19/132; H04N 19/159; H04N 19/167; H04N 19/176; H04N 19/593
See application file for complete search history.

(56) References Cited

U.S. PATENT DOCUMENTS 10,674,165 B2    6/2020  Panusopone et al.
2018/0176587 A1  6/2018  Panusopone et al.
(Continued)

FOREIGN PATENT DOCUMENTS

WO    2020116402 A1    6/2020
WO    2021037078 A1    3/2021

OTHER PUBLICATIONS

Muhammed Coban et al., "Algorithm description of Enhanced Compression Model 2 (ECM 2)", JVET-W2025, Joint Video Experts Team (JVET) of ITU-T SG 16 WP 3 and ISO/IEC JTC 1/SC 29, 23rd Meeting, by teleconference, pp. 1-22, Sep. 2, 2021, (23p).
(Continued)

*Primary Examiner* — Hesham K Abouzahra
(74) *Attorney, Agent, or Firm* — Arch & Lake LLP; Hao Tan; Shen Wang

(57) ABSTRACT

Methods, apparatuses, and non-transitory computer-readable storage mediums are provided for video coding with an intra prediction coding mode. In one method, a decoder determines prediction sample values of one or more video blocks based on position-dependent intra prediction combination (PDPC) operations for one or more intra predictions of the one or more video blocks to unify the PDPC operations in the intra prediction coding mode; and in response to determining that a direct current (DC) mode, a planar mode, or an angular mode is applied in the one or more intra predictions of the one or more video blocks, the decoder may disable the PDPC operations respectively for the DC
(Continued)

TIMD modes with fusion mode, the planar mode, or the angular mode to unify the PDPC operations in the intra prediction coding mode.

15 Claims, 20 Drawing Sheets

Related U.S. Application Data

(60) Provisional application No. 63/250,186, filed on Sep. 29, 2021.

(51) Int. Cl.

| | |
|---|---|
| *H04N 19/11* | (2014.01) |
| *H04N 19/132* | (2014.01) |
| *H04N 19/159* | (2014.01) |
| *H04N 19/167* | (2014.01) |
| *H04N 19/176* | (2014.01) |
| *H04N 19/593* | (2014.01) |

(52) U.S. Cl.
CPC ......... *H04N 19/159* (2014.11); *H04N 19/167* (2014.11); *H04N 19/176* (2014.11); *H04N 19/593* (2014.11)

(56) References Cited

U.S. PATENT DOCUMENTS

| | | | |
|---|---|---|---|
| 2019/0166370 A1* | 5/2019 | Xiu | H04N 19/176 |
| 2020/0267397 A1* | 8/2020 | Panusopone | H04N 19/11 |
| 2020/0382768 A1 | 12/2020 | Kotra et al. | |
| 2021/0176465 A1 | 6/2021 | Ray et al. | |
| 2021/0289198 A1 | 9/2021 | Liao et al. | |
| 2023/0108480 A1* | 4/2023 | Li | H04N 19/176 |
| | | | 375/240.02 |

OTHER PUBLICATIONS

International Search Report issued on Application No. PCT/US2022/045279 dated Jan. 26, 2023, (4p).

Virginie Drugeon, "Cross-check of JVET-O0449 Decoder-side Intra Mode Derivation with Prediction Fusion Using Planar", Joint Video Experts Team (JVET) of ITU-T SG 16 WP 3 and ISO/IEC JTC 1/SC 29/WG 11, JVET-O0720, 15th Meeting: Gothenburg, SE, Jul. 3-12, 2019, (2p).

* cited by examiner

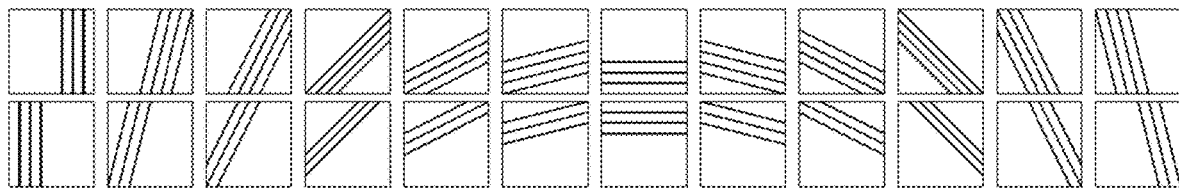
FIG. 6
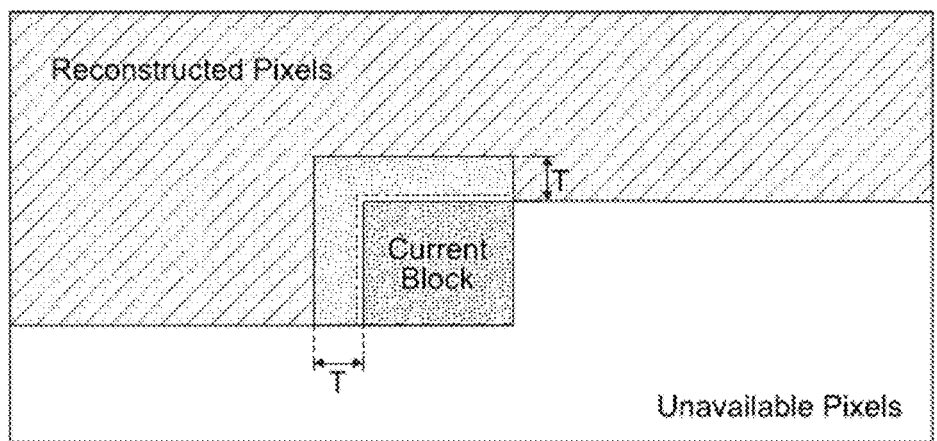
FIG. 7
FIG. 8

Prediction of the 1st intra mode

Prediction of the 2nd intra mode

If it is angular
N
Y

PDPC process

If it is angular
N
Y

PDPC process

Fusion

TIMD modes with fusion

Prediction of the 1st intra mode

Prediction of the 2nd intra mode

Fusion

If the 1st mode is DC or Planar
N
Y

PDPC process

TIMD modes with fusion

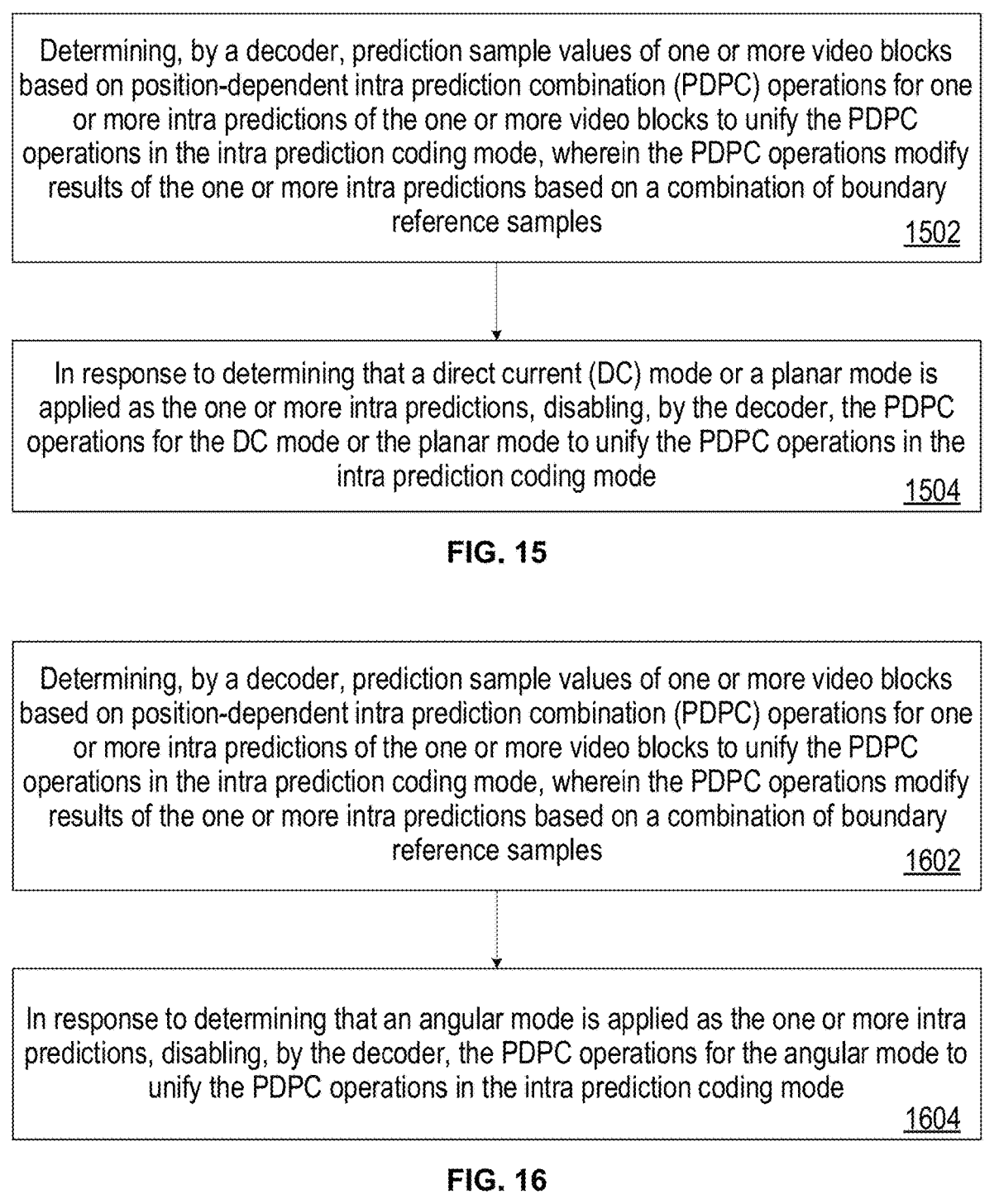

Determining, by a decoder, prediction sample values of one or more video blocks based on position-dependent intra prediction combination (PDPC) operations for one or more intra predictions of the one or more video blocks to unify the PDPC operations in the intra prediction coding mode, wherein the PDPC operations modify results of the one or more intra predictions based on a combination of boundary reference samples                                1502

In response to determining that a direct current (DC) mode or a planar mode is applied as the one or more intra predictions, disabling, by the decoder, the PDPC operations for the DC mode or the planar mode to unify the PDPC operations in the intra prediction coding mode                                1504

FIG. 15

Determining, by a decoder, prediction sample values of one or more video blocks based on position-dependent intra prediction combination (PDPC) operations for one or more intra predictions of the one or more video blocks to unify the PDPC operations in the intra prediction coding mode, wherein the PDPC operations modify results of the one or more intra predictions based on a combination of boundary reference samples                                1602

In response to determining that an angular mode is applied as the one or more intra predictions, disabling, by the decoder, the PDPC operations for the angular mode to unify the PDPC operations in the intra prediction coding mode                                1604

FIG. 16

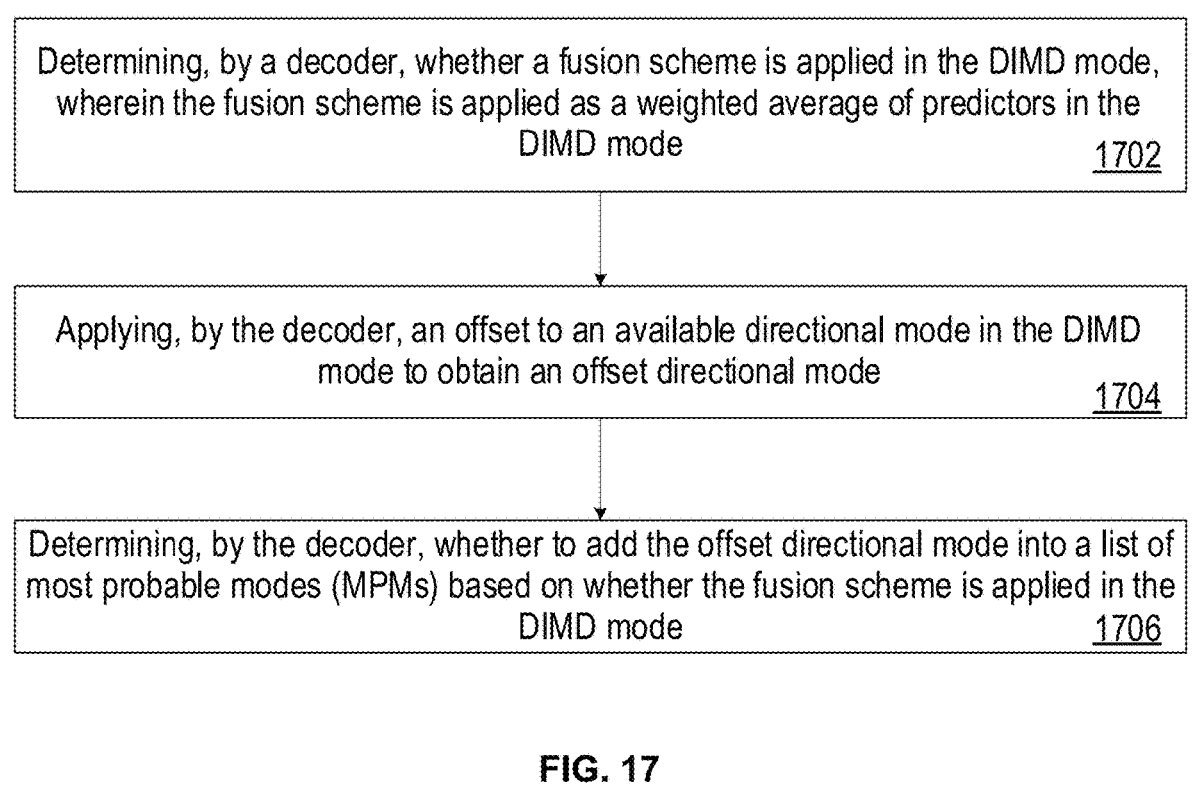

Determining, by a decoder, whether a fusion scheme is applied in the DIMD mode, wherein the fusion scheme is applied as a weighted average of predictors in the DIMD mode                                                      1702

Applying, by the decoder, an offset to an available directional mode in the DIMD mode to obtain an offset directional mode                                          1704

Determining, by the decoder, whether to add the offset directional mode into a list of most probable modes (MPMs) based on whether the fusion scheme is applied in the DIMD mode                                                             1706

FIG. 17

METHODS AND DEVICES FOR DECODER-SIDE INTRA MODE DERIVATION

CROSS-REFERENCE TO RELATED APPLICATION

This application is a continuation application of PCT Application No. PCT/US2022/045279, filed on Sep. 29, 2022, which is based upon and claims priority to Provisional Applications No. 63/250,186, filed on Sep. 29, 2021, the entire disclosures of which are incorporated herein by reference for all purposes.

TECHNICAL FIELD

This disclosure is related to video coding and compression. More specifically, this disclosure relates to encoders and decoders with decoder-side intra mode derivation (DIMD).

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. For example, video coding standards include Versatile Video Coding (VVC), Joint Exploration test Model (JEM), High-Efficiency Video Coding (HEVC/H.265), Advanced Video Coding (AVC/H.264), Moving Picture Expert Group (MPEG) coding, or the like. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

SUMMARY

Examples of the present disclosure provide methods and apparatus for video decoding with an intra prediction coding mode.

According to a first aspect of the present disclosure, a method for video decoding with an intra prediction coding mode is provided. The method may include: determining, by a decoder, prediction sample values of one or more video blocks based on position-dependent intra prediction combination (PDPC) operations for one or more intra predictions of the one or more video blocks to unify the PDPC operations in the intra prediction coding mode, wherein the PDPC operations modify results of the one or more intra predictions based on a combination of boundary reference samples; and in response to determining that a direct current (DC) mode or a planar mode is applied in the one or more intra predictions of the one or more video blocks, disabling, by the decoder, the PDPC operations for the DC mode or the planar mode to unify the PDPC operations in the intra prediction coding mode.

According to a second aspect of the present disclosure, a method for video decoding with an intra prediction coding mode is provided. The method may include: determining, by a decoder, prediction sample values of one or more video blocks based on position-dependent intra prediction combination (PDPC) operations for one or more intra predictions of the one or more video blocks to unify the PDPC operations in the intra prediction coding mode, wherein the PDPC operations modify results of the one or more intra predictions based on a combination of boundary reference samples; and in response to determining that an angular mode is applied in the one or more intra predictions of the one or more video blocks, disabling, by the decoder, the PDPC operations for the angular mode to unify the PDPC operations in the intra prediction coding mode.

According to a third aspect of the present disclosure, a method for video decoding with an intra prediction coding mode is provided. The method may include: determining, by a decoder, whether a fusion scheme is applied in the DIMD mode, wherein the fusion scheme is applied as a weighted average of predictors in the DIMD mode; applying, by the decoder, an offset to an available directional mode in the DIMD mode to obtain an offset directional mode; and determining, by the decoder, whether to add the offset directional mode into a list of most probable modes (MPMs) based on whether the fusion scheme is applied in the DIMD mode.

According to a fourth aspect of the present disclosure, a method for video coding with an intra prediction coding mode is provided. The method may include: determining, by an encoder, prediction sample values of one or more video blocks based on position-dependent intra prediction combination (PDPC) operations for one or more intra predictions of the one or more video blocks to unify the PDPC operations in the intra prediction coding mode, wherein the PDPC operations modify results of the one or more intra predictions based on a combination of boundary reference samples; and in response to determining that a direct current (DC) mode or a planar mode is applied in the one or more intra predictions of the one or more video blocks, disabling, by the encoder, the PDPC operations for the DC mode or the planar mode to unify the PDPC operations in the intra prediction coding mode.

According to a fifth aspect of the present disclosure, a method for video coding with an intra prediction coding mode is provided. The method may include: determining, by an encoder, prediction sample values of one or more video blocks based on position-dependent intra prediction combination (PDPC) operations for one or more intra predictions of the one or more video blocks to unify the PDPC operations in the intra prediction coding mode, wherein the PDPC operations modify results of the one or more intra predictions based on a combination of boundary reference samples; and in response to determining that an angular mode is applied in the one or more intra predictions of the one or more video blocks, disabling, by the encoder, the PDPC operations for the angular mode to unify the PDPC operations in the intra prediction coding mode.

According to a sixth aspect of the present disclosure, a method for video coding with an intra prediction coding mode is provided. The method may include: determining, by an encoder, whether a fusion scheme is applied in the DIMD mode, wherein the fusion scheme is applied as a weighted average of predictors in the DIMD mode; applying, by the encoder, an offset to an available directional mode in the DIMD mode to obtain an offset directional mode; and determining, by the encoder, whether to add the offset directional mode into a list of most probable modes (MPMs) based on whether the fusion scheme is applied in the DIMD mode.

According to a seventh aspect of the present disclosure, an apparatus for video decoding is provided. The apparatus may include one or more processors; and a memory configured to store instructions executable by the one or more processors. In some examples, the one or more processors, upon execution of the instructions, are configured to: determine prediction sample values of one or more video blocks based on position-dependent intra prediction combination (PDPC) operations for one or more intra predictions of the one or more video blocks to unify the PDPC operations in the intra prediction coding mode, where the PDPC operations modify results of the one or more intra predictions based on a combination of boundary reference samples; and in response to determining that a direct current (DC) mode or a planar mode is applied in the one or more intra predictions of the one or more video blocks, disable the PDPC operations for the DC mode or the planar mode to unify the PDPC operations in the intra prediction coding mode; or in response to determining that an angular mode is applied in the one or more intra predictions of the one or more video blocks, disable the PDPC operations for the angular mode to unify the PDPC operations in the intra prediction coding mode.

According to an eighth aspect of the present disclosure, a non-transitory computer readable storage medium is provided. In some examples, the non-transitory computer readable storage medium may store a bitstream to be decoded by a decoding method. In some examples, the decoding method may include: determining prediction sample values of one or more video blocks based on position-dependent intra prediction combination (PDPC) operations for one or more intra predictions of the one or more video blocks to unify the PDPC operations in the intra prediction coding mode, where the PDPC operations modify results of the one or more intra predictions based on a combination of boundary reference samples; and in response to determining that a direct current (DC) mode or a planar mode is applied in the one or more intra predictions of the one or more video blocks, disabling the PDPC operations for the DC mode or the planar mode to unify the PDPC operations in the intra prediction coding mode; or in response to determining that an angular mode is applied in the one or more intra predictions of the one or more video blocks, disabling the PDPC operations for the angular mode to unify the PDPC operations in the intra prediction coding mode.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 6 illustrates examples of allowed GPM partitions in accordance with some implementations of the present disclosure.

FIG. 7 illustrates an example of chosen pixels on which a gradient analysis is performed in accordance with some implementations of the present disclosure.

FIG. 8 illustrates a convolution process in accordance with some implementations of the present disclosure.

FIG. 15 is a flow chart showing a method of video decoding in accordance with some examples of the present disclosure.

FIG. 16 is a flow chart showing a method of video decoding in accordance with some examples of the present disclosure.

FIG. 17 is a flow chart showing a method of video decoding in accordance with some examples of the present disclosure.

DETAILED DESCRIPTION

Figure 1:
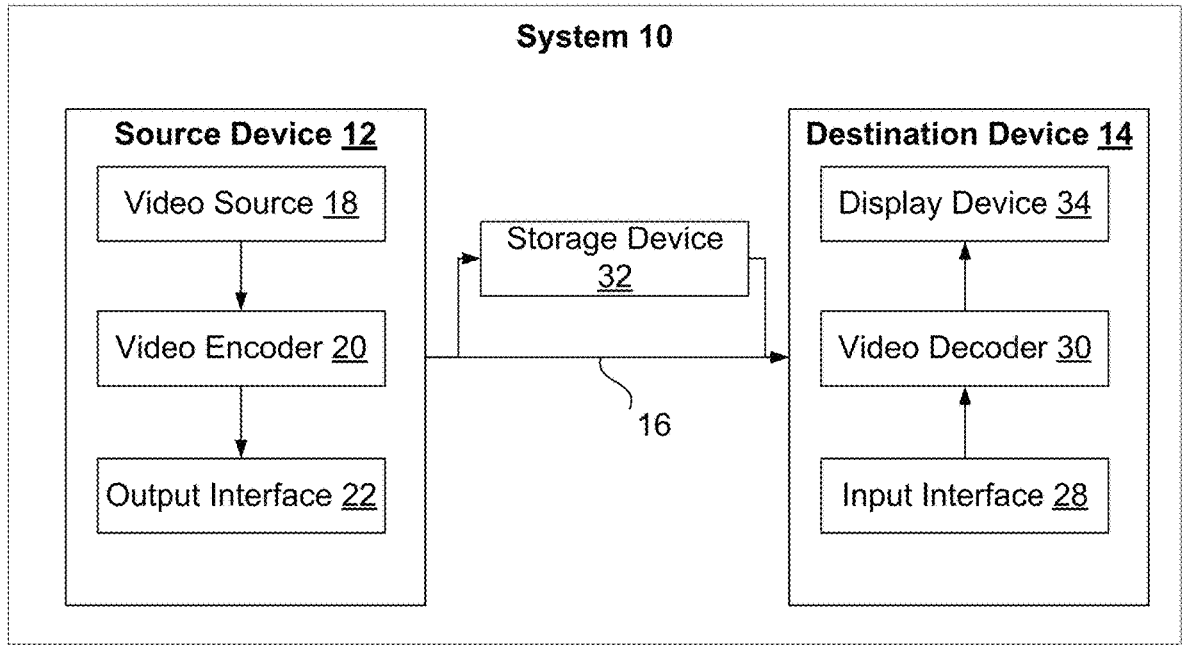
FIG. 1 is a block diagram illustrating an exemplary system for encoding and decoding video blocks in accordance with some implementations of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc., may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Various video coding techniques may be used to compress video data. Video coding is performed according to one or more video coding standards. For example, nowadays, some well-known video coding standards include Versatile Video Coding (VVC), High Efficiency Video Coding (HEVC, also known as H.265 or MPEG-H Part2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China. Most of the existing video coding standards are built upon the famous hybrid video coding framework i.e., using block-based prediction methods (e.g., inter-prediction, intra-prediction) to reduce redundancy present in video images or sequences and using transform coding to compact the energy of the prediction errors. An important goal of video coding techniques is to compress video data into a form that uses a lower bit rate while avoiding or minimizing degradations to video quality.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The AVS1 standard video part was promulgated as the Chinese national standard in February 2006. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. On May 2016, the AVS2 was issued as the Chinese national standard. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC. In March 2019, at the 68-th AVS meeting, the AVS3-P2 baseline was finished, which provides approximately 30% bit-rate savings over the HEVC standard. Currently, there is one reference software, called high performance model (HPM), is maintained by the AVS group to demonstrate a reference implementation of the AVS3 standard.

FIG. 1 is a block diagram illustrating an exemplary system 10 for encoding and decoding video blocks in parallel in accordance with some implementations of the present disclosure. As shown in FIG. 1, the system 10 includes a source device 12 that generates and encodes video data to be decoded at a later time by a destination device 14. The source device 12 and the destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may comprise any type of communication medium or device capable of moving the encoded video data from the source device 12 to the destination device 14. In one example, the link 16 may comprise a communication medium to enable the source device 12 to transmit the encoded video data directly to the destination device 14 in real time. The encoded video data may be modulated according to a communication standard, such as a wireless communication protocol, and transmitted to the destination device 14. The communication medium may comprise any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20 and the output interface 22. The video source 18 may include a source such as a video capturing device, e.g., a video camera, a video archive containing previously captured video, a video feeding inter-face to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired appli-cations.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a stor-age medium, or stored on a file server.

In some implementations, the destination device 14 may include the display device 34, which may be an integrated display device and an external display device that is con-figured to communicate with the destination device 14. The display device 34 displays the decoded video data to a user, and may comprise any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microproces-sors, Digital Signal Processors (DSPs), Application Specific Integrated Circuits (ASICs), Field Programmable Gate Arrays (FPGAs), discrete logic, software, hardware, firm-ware or any combinations thereof. When implemented par-tially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
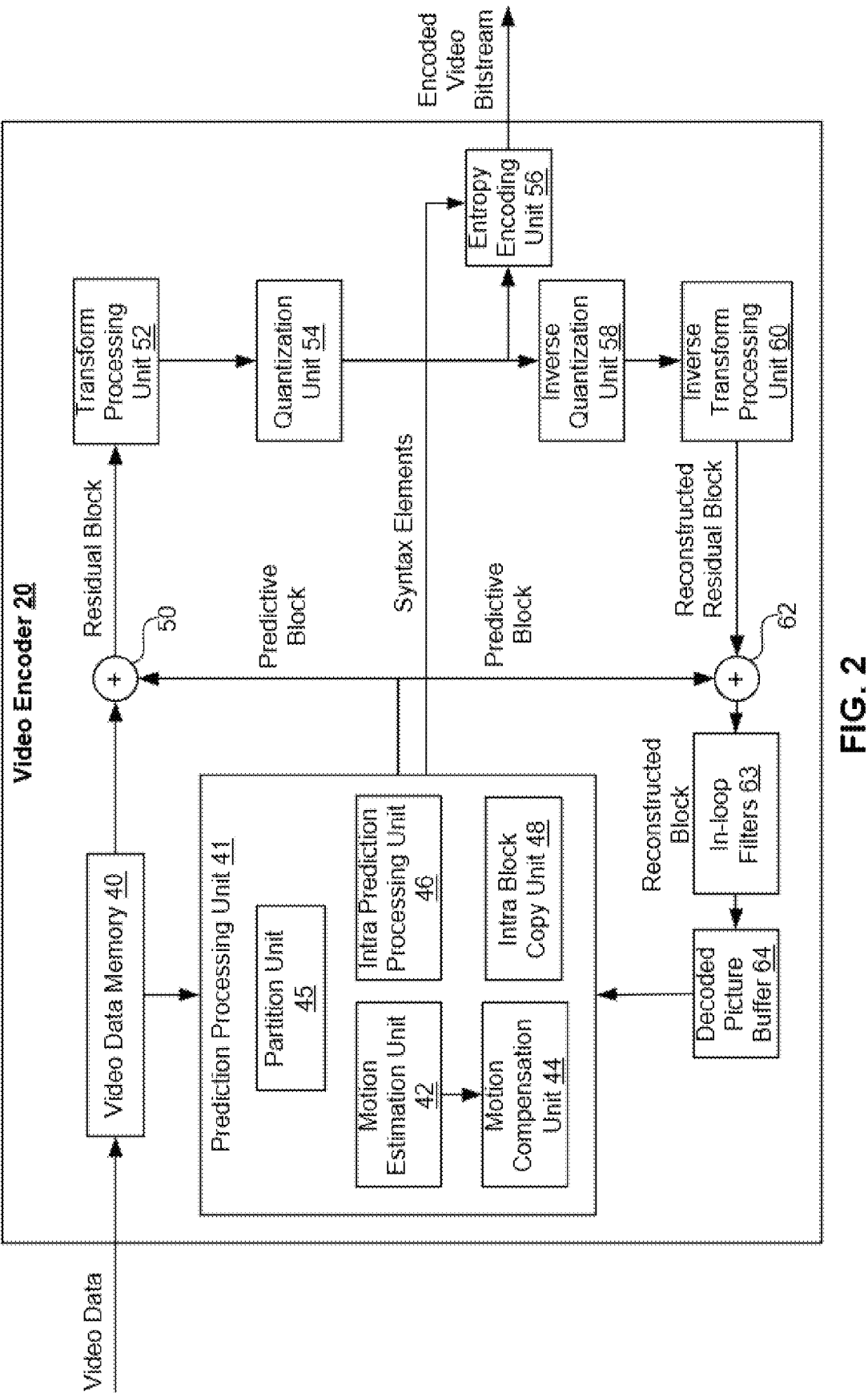
FIG. 2 is a block diagram illustrating an exemplary video encoder in accordance with some implementations of the present disclosure.

FIG. 2 is a block diagram illustrating an exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 2, the video encoder 20 includes a video data memory 40, a prediction processing unit 41, a Decoded Picture Buffer (DPB) 64, a summer 50, a transform process-ing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter and/or Adaptive in-Loop Filter (ALF), may also be used in addition to the deblocking filter to filter an output of the summer 62. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 2, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g. a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit

41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 1, or archived in the storage device 32 as shown in FIG. 1 for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 3:
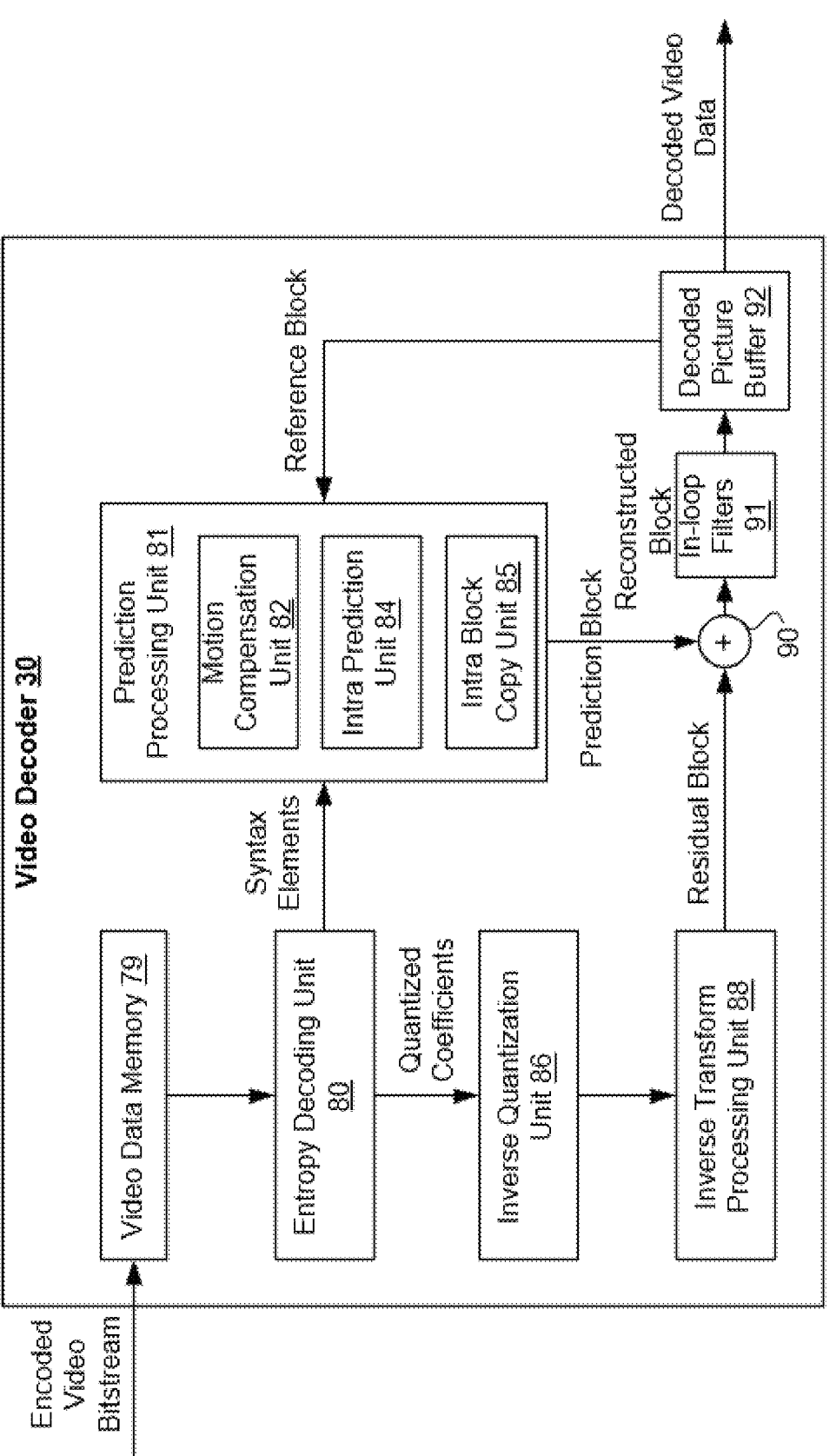
FIG. 3 is a block diagram illustrating an exemplary video decoder in accordance with some implementations of the present disclosure.

FIG. 3 is a block diagram illustrating an exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
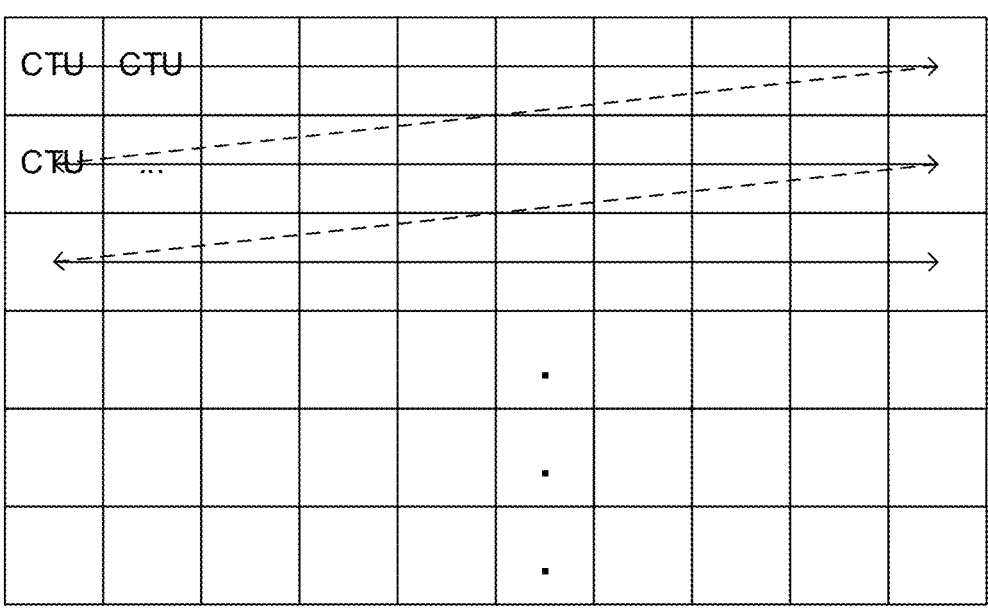
FIGS. 4A through 4E are block diagrams illustrating how a frame is recursively partitioned into multiple video blocks of different sizes and shapes in accordance with some implementations of the present disclosure.
Figure 4B:
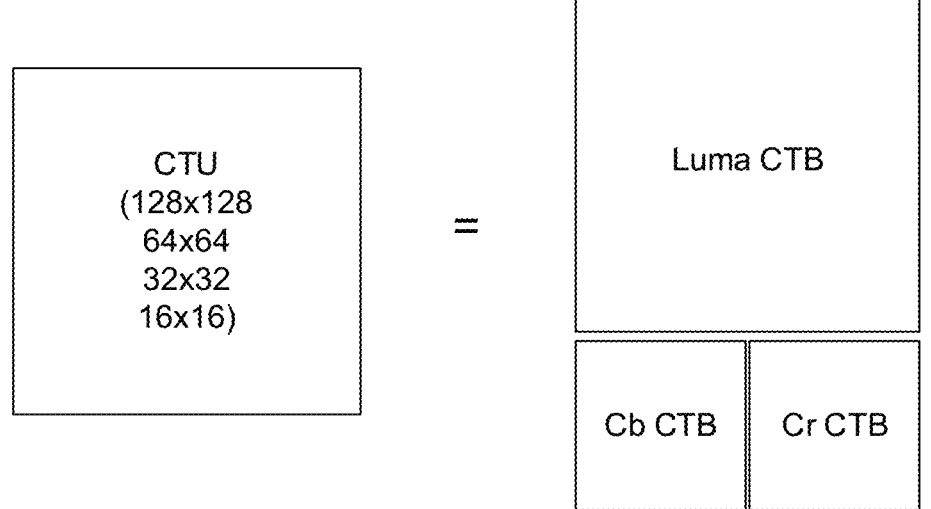

As shown in FIG. 4A, the video encoder 20 (or more specifically the partition unit 45) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one CTB of luma samples, two corresponding coding tree blocks of chroma samples, and syntax elements used to code the samples of the coding tree blocks. The syntax elements describe properties of different types of units of a coded block of pixels and how the video sequence may be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
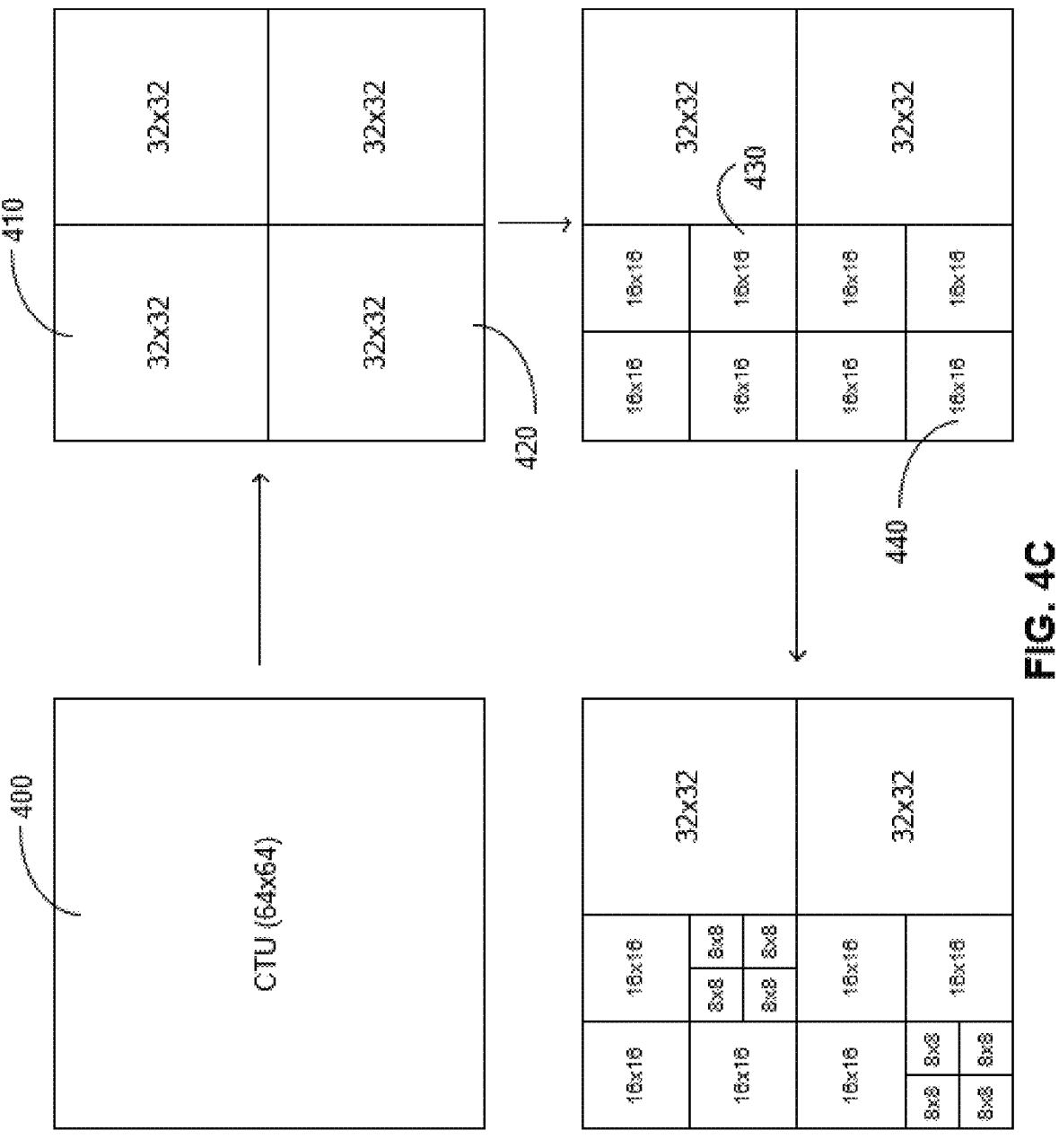
Figure 4D:
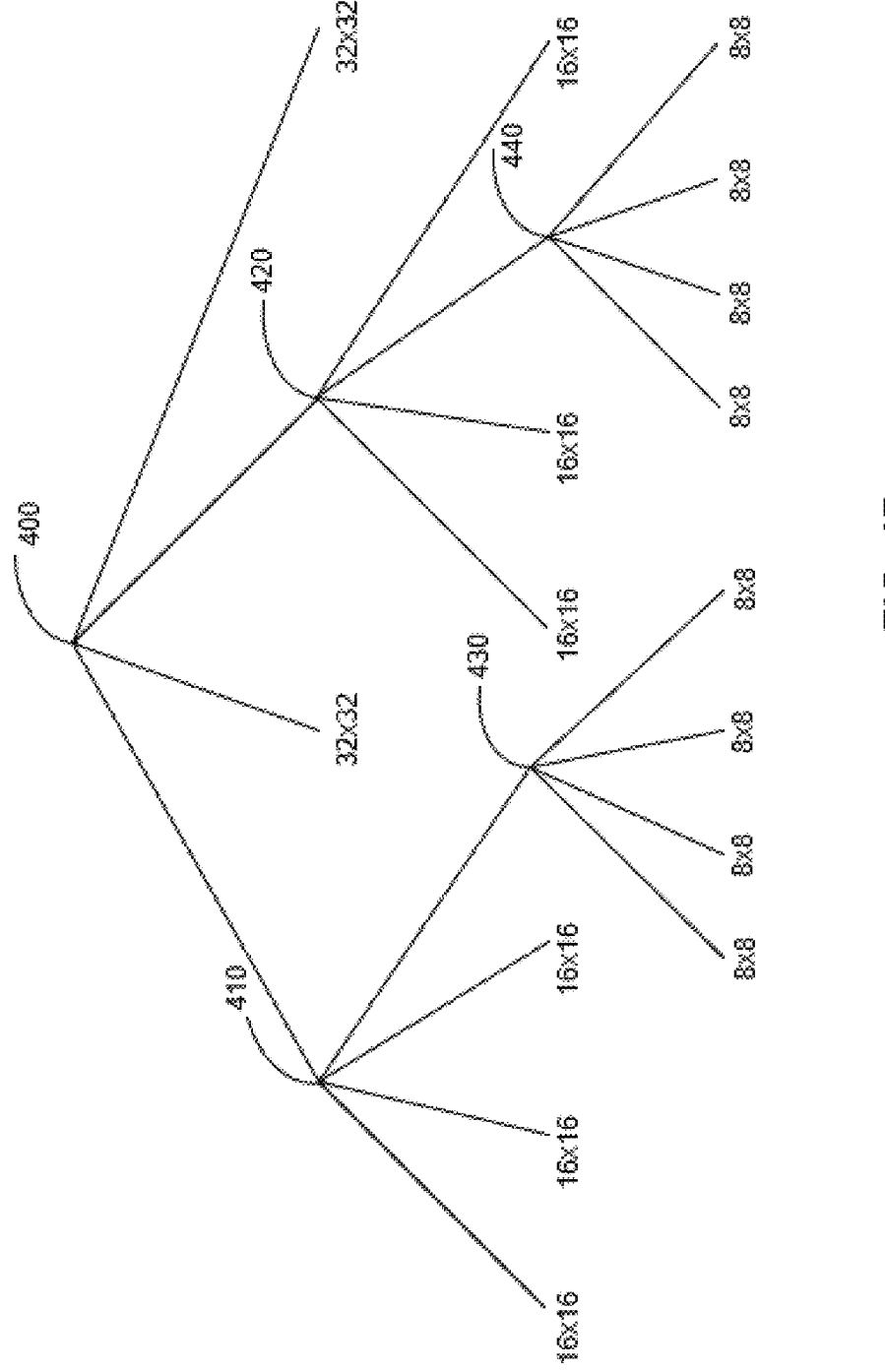
Figure 4E:
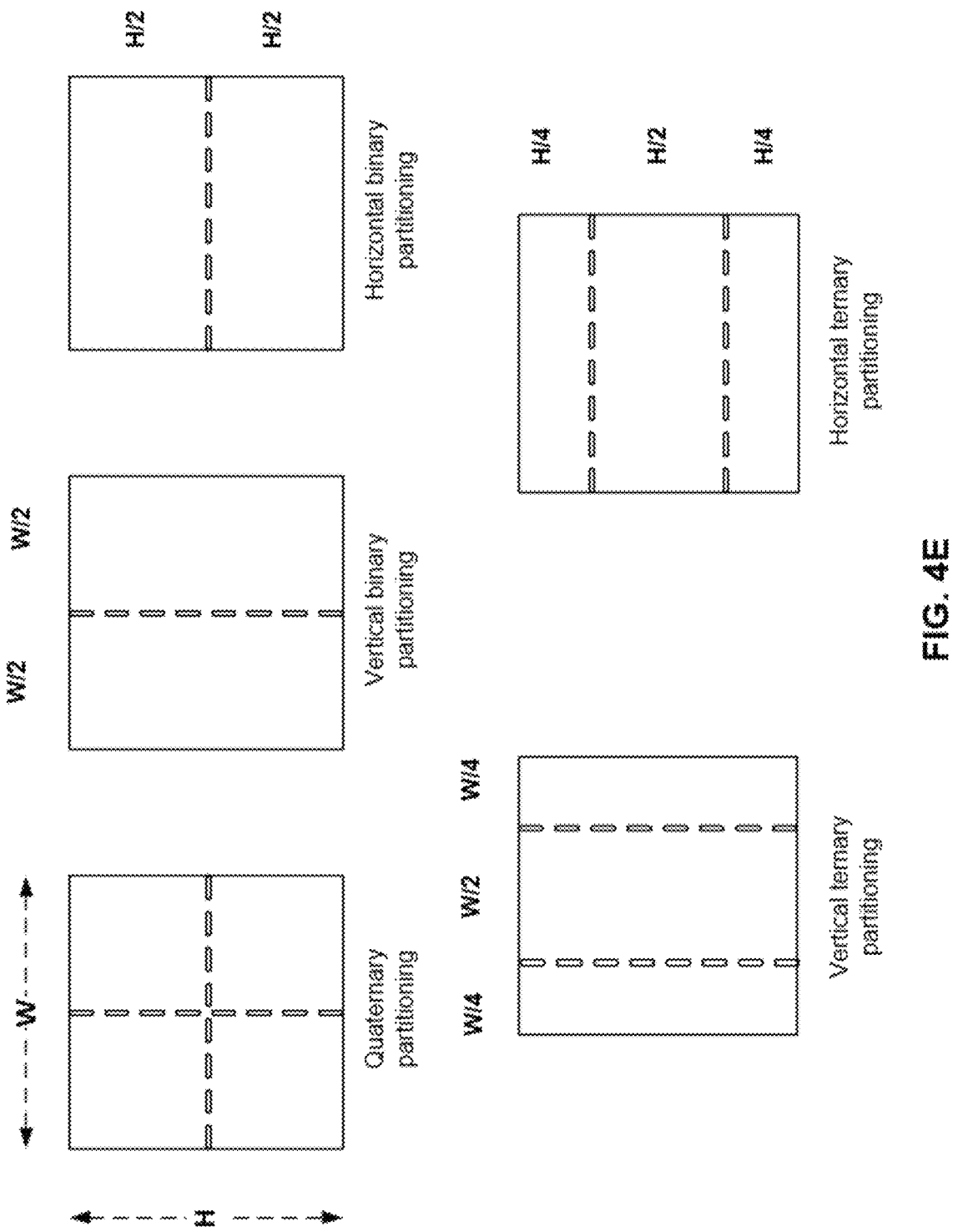

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 4C, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a CB of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU may be split into CUs to adapt to varying local characteristics based on quad/ternary/binary-tree partitions. In the multi-type tree structure, one CTU is partitioned by a quad-tree structure and each quad-tree leaf CU may be further partitioned by a binary and ternary tree structure. As shown in FIG. 4E, there are five possible partitioning types of a coding block having a width W and a height H, i.e., quaternary partitioning, horizontal binary partitioning, vertical binary partitioning, horizontal ternary partitioning, and vertical ternary partitioning.

In some implementations, the video encoder 20 may further partition a coding block of a CU into one or more M×N PBs. A PB is a rectangular (square or non-square) block of samples on which the same prediction, inter or intra, is applied. A PU of a CU may comprise a PB of luma samples, two corresponding PBs of chroma samples, and syntax elements used to predict the PBs. In monochrome pictures or pictures having three separate color planes, a PU may comprise a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, the video encoder 20 may use quad-tree partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In mono-chrome pictures or pictures having three separate color planes, a TU may comprise a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever-improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit 42 as described above in connection with FIG. 2, the motion vector predictor of the current CU is subtracted from the actual motion vector of the current CU to produce a Motion Vector Difference (MVD) for the current CU. By doing so, there is no need to encode the motion vector determined by the motion estimation unit 42 for each CU of a frame into the video bitstream and the amount of data used for representing motion information in the video bitstream may be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

Position-Dependent Intra Prediction Combination

In VVC, the results of intra prediction of DC, planar and several angular modes are further modified by a position dependent intra prediction combination (PDPC) method. PDPC is an intra prediction method which invokes a combination of the boundary reference samples and HEVC style intra prediction with filtered boundary reference samples. PDPC is applied to the following intra modes without signaling: planar, DC, intra angles less than or equal to horizontal, and intra angles greater than or equal to vertical and less than or equal to 80. If the current block is Bdpcm mode or MRL index is larger than 0, PDPC is not applied.

The prediction sample pred(x',y') is predicted using an intra prediction mode (DC, planar, angular) and a linear combination of reference samples according to the equation as follows:

$$pred(x', y') = \text{Clip}\,(0, (1 << \text{Bit Depth}) - 1, (wL \times R - 1, y' + wT \times$$
$$Rx', -1 + (64 - wL - wT) \times pred(x', y') + 32) >> 6)$$

where $Rx,-1$, $R-1,y$ represent the reference samples located at the top and left boundaries of current sample (x, y), respectively.

If PDPC is applied to DC, planar, horizontal, and vertical intra modes, additional boundary filters are not needed, as required in the case of HEVC DC mode boundary filter or horizontal/vertical mode edge filters. PDPC process for DC and Planar modes is identical. For angular modes, if the current angular mode is HOR_IDX or VER_IDX, left or top reference samples is not used, respectively. The PDPC weights and scale factors are dependent on prediction modes and the block sizes. PDPC is applied to the block with both width and height greater than or equal to 4.

Figure 5A:
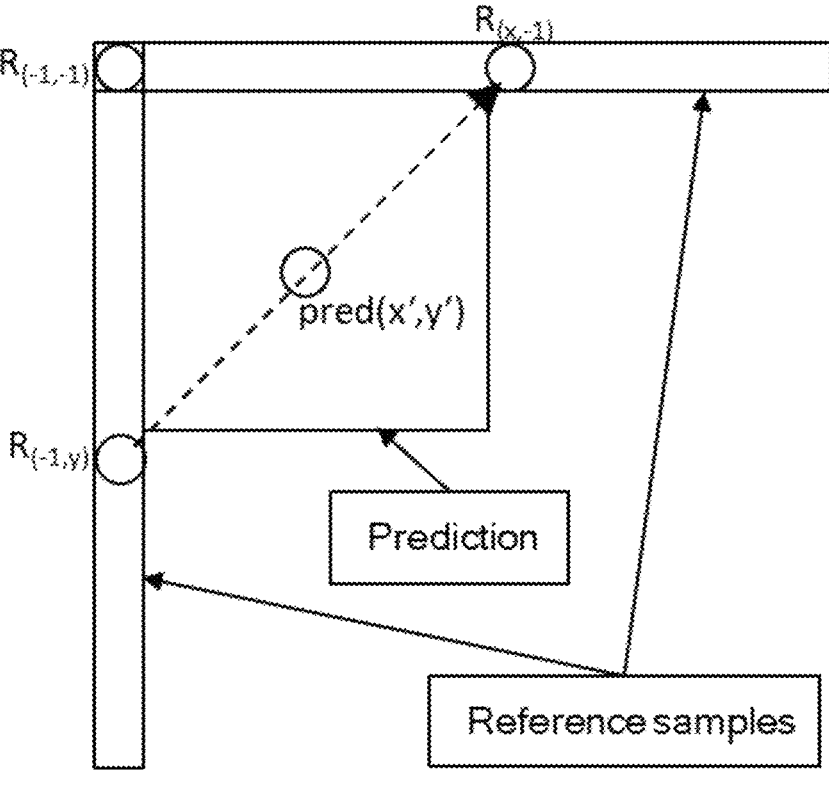
FIG. 5A illustrates a definition of samples used by PDPC applied to a prediction mode in accordance with some implementations of the present disclosure.
Figure 5B:
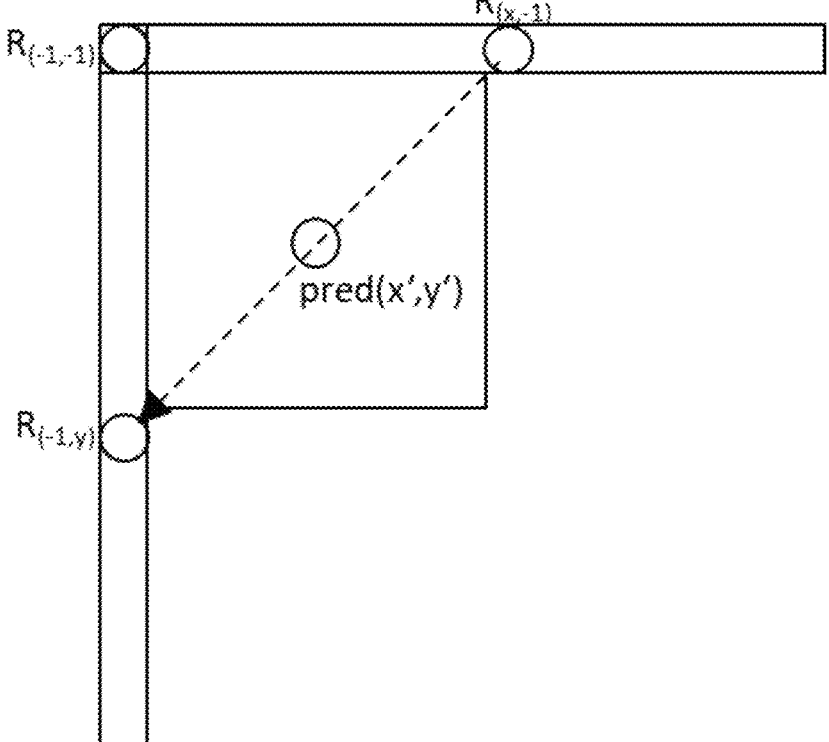
FIG. 5B illustrates a definition of samples used by PDPC applied to a prediction mode in accordance with some implementations of the present disclosure.
Figure 5C:
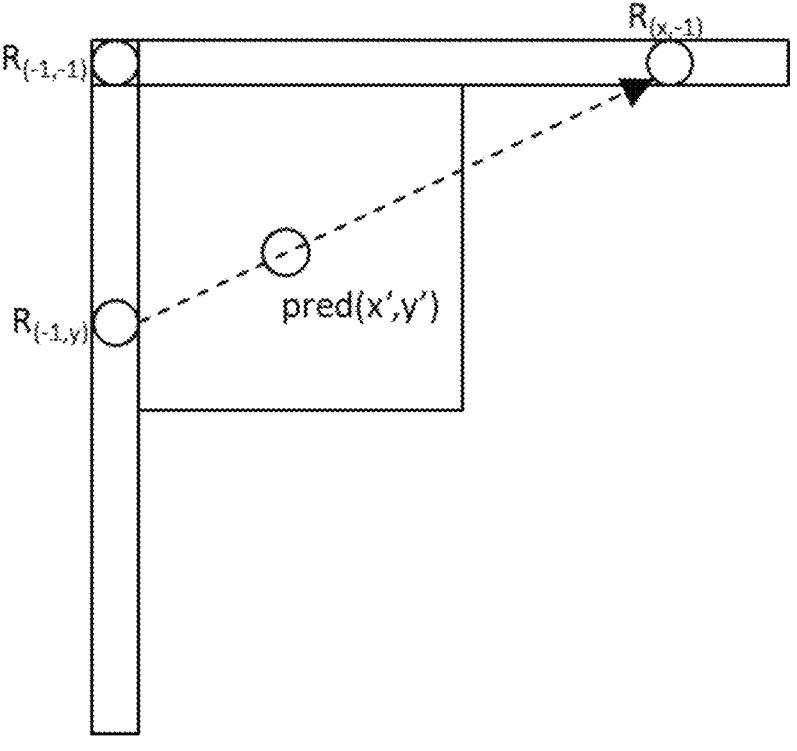
FIG. 5C illustrates a definition of samples used by PDPC applied to a prediction mode in accordance with some implementations of the present disclosure.
Figure 5D:
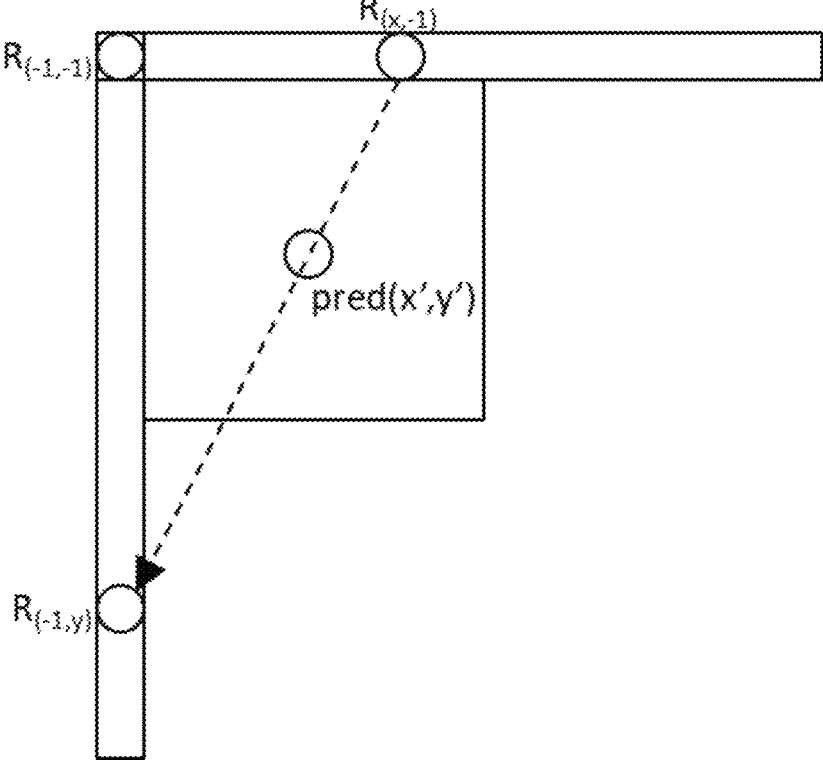
FIG. 5D illustrates a definition of samples used by PDPC applied to a prediction mode in accordance with some implementations of the present disclosure.

FIGS. 5A-5D illustrate the definition of reference samples (Rx,−1 and R−1,y) for PDPC applied over various prediction modes. FIG. 5A shows an example of a diagonal top-right mode. FIG. 5B shows an example of a diagonal bottom-left mode. FIG. 5C shows an example of an adjacent diagonal top-right mode. FIG. 5D shows an example of an adjacent diagonal bottom-left mode. The prediction sample pred(x', y') is located at (x', y') within the prediction block. As an example, the coordinate x of the reference sample Rx,−1 is given by: x=x'+y'+1, and the coordinate y of the reference sample R−1,y is similarly given by: y=x'+y'+1 for the diagonal modes. For the other angular mode, the reference samples Rx,−1 and R−1,y could be located in fractional sample position. In this case, the sample value of the nearest integer sample location is used.

As mentioned earlier, the intra prediction samples are generated from either a non-filtered or a filtered set of neighboring reference samples, which may introduce discontinuities along the block boundaries between the current coding block and its neighbors. To resolve such problem, boundary filtering is applied in the HEVC by combing the first row/column of prediction samples of DC, horizontal (i.e., mode 18) and vertical (i.e., mode 50) prediction modes with the unfiltered reference samples utilizing a 2-tap filter (for DC mode) or a gradient-based smoothing filter (for horizontal and vertical prediction modes).

Gradient PDPC

In VVC, for a few scenarios, PDPC may not be applied due to the unavailability of the secondary reference samples. A gradient based PDPC, extended from horizontal/vertical mode, is applied. The PDPC weights (wT/wL) and nScale parameter for determining the decay in PDPC weights with respect to the distance from left/top boundary are set equal to corresponding parameters in horizontal/vertical mode, respectively. When the secondary reference sample is at a fractional sample position, bilinear interpolation is applied.

Geometric Partition Mode (GPM)

In the VVC, a geometric partitioning mode is supported for inter prediction. The geometric partitioning mode is signaled by one CU-level flag as one special merge mode. In the current GPM design, 64 partitions are supported in total by the GPM mode for each possible CU size with both width and height not smaller than 8 and not larger than 64, excluding 8×64 and 64×8.

When this mode is used, a CU is split into two parts by a geometrically located straight line as shown in FIG. 6. The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. If geometric partitioning mode is used for the current CU, then a geometric partition index indicating the partition mode of the geometric partition (angle and offset), and two merge indices (one for each partition) are further signaled. The number of maximum GPM candidate size is signaled explicitly at sequence level.

Blending Along Geometric Partition Edge

After each geometric partition is obtained using its own motion, blending is applied to the two uni-prediction signals to derive samples around geometric partition edge. The blending weight for each position of the CU are derived based on the distance from each individual sample position to the corresponding partition edge.

GPM Signaling Design

According to the current GPM design, the usage of the GPM is indicated by signaling one flag at the CU-level. The flag is only signaled when the current CU is coded by either merge mode or skip mode. Specifically, when the flag is equal to one, it indicates the current CU is predicted by the GPM. Otherwise (the flag is equal to zero), the CU is coded by another merge mode such as regular merge mode, merge mode with motion vector differences, combined inter and intra prediction and so forth. When the GPM is enabled for the current CU, one syntax element, namely merge_gpm_partition_idx, is further signaled to indicate the applied geometric partition mode (which specifies the direction and the offset of the straight line from the CU center that splits the CU into two partitions as shown in FIG. 6). After that, two syntax elements merge_gpm_idx0 and merge_gpm_idx1 are signaled to indicate the indices of the uni-prediction merge candidates that are used for the first and second GPM partitions. More specifically, those two syntax elements are used to determine the uni-directional MVs of the two GPM partitions from the uni-prediction merge list as described in the section "uni-prediction merge list construction". According to the current GPM design, in order to make two uni-directional MVs more different, the two indices cannot be the same. Based on such prior knowledge, the uni-prediction merge index of the first GPM partition is firstly signaled and used as the predictor to reduce the signaling overhead of the uni-prediction merge index of the second GPM partition. In details, if the second uni-prediction merge index is smaller than the first uni-prediction merge index, its original value is directly signaled. Otherwise (the second uni-prediction merge index is larger than the first uni-prediction merge index), its value is subtracted by one before being signaled to bit-stream. At decoder side, the first uni-prediction merge index is firstly decoder. Then, for the decoding of the second uni-prediction merge index, if the parsed value is smaller than the first uni-prediction merge index, the second uni-prediction merge index is set equal to the parse value; otherwise (the parsed value is equal to or larger than the first uni-prediction merge index), the second uni-prediction merge index is set equal to the parsed value plus one. Table 1 illustrates the existing syntax elements that are used for the GPM mode in the current VVC specification.

TABLE 1

The existing GPM syntax elements in merge data syntax table of the VVC specification

|  | Descriptor |
|---|---|
| merge_data( x0, y0, cbWidth, cbHeight, chType ) { | |
| ... ... | |
| if( !ciip_flag[ x0 ][ y0 ] ) { | |
| merge_gpm_partition_idx[ x0 ][ y0 ] | ae(v) |
| merge_gpm_idx0[ x0 ][ y0 ] | ae(v) |
| if( MaxNumGpmMergeCand > 2 ) | |
| merge_gpm_idx1[ x0 ][ y0 ] | ae(v) |
| } | |
| ... ... | |
| } | |

On the other hand, in the current GPM design, truncated unary code is used for the binarization of the two uni-prediction merge indices, i.e., merge_gpm_idx0 and merge_gpm_idx1. Additionally, because the two uni-prediction merge indices cannot be the same, different maximum values are used to truncate the code-words of the two uni-prediction merge indices, which are set equal to MaxGPMMergeCand−1 and MaxGPMMergeCand−2 for merge_gpm_idx0 and merge_gpm_idx1, respectively. MaxGPMMergeCand is the number of the candidates in the uni-prediction merge list.

When the GPM/AWP mode is applied, two different binarization methods are applied to translate the syntax merge_gpm_partition_idx into a string of binary bits. Specifically, the syntax element is binarized by fixed-length code and truncated binary code in the VVC and AVS3 standards, respectively. Meanwhile, for the AWP mode in the AVS3, different maximum values are used for the binarizations of the value of the syntax element.

Spatial Angular Weighted Prediction (SAWP)

In the AVS, a spatial angular weighted prediction (SAWP) mode which extends the GPM mode to the intra block. Instead of weighting two inter prediction blocks, in the SAWP mode, two intra prediction blocks are weighted. The two intra prediction blocks are predicted using two different intra prediction modes which are selected from the intra prediction modes. The intra prediction mode is selected from angular mode 5 to 30. The maximum size is 32×32. The 2 most probable modes (MPMs) of regular intra mode are used for MPM derivation of the SAWP mode.

Multi-direction intra prediction design (MDIP) which follows the same design spirit of SAWP but with some subtle differences in certain design details.

Decoder-Side Intra Mode Derivation (DIMD)

DIMD is an intra coding tool wherein the luma intra prediction mode (IPM) is not transmitted via the bitstream. Instead, it is derived using previously encoded/decoded pixels, in an identical fashion at the encoder and at the decoder. The DIMD method performs a texture gradient processing to derive 2 best modes. These two modes and planar mode are then applied to the block and their predictors are weighted averaged. The selection of DIMD is signaled in the bitstream for intra coded blocks using a flag. At the decoder, if the DIMD flag is true, the intra prediction mode is derived in the reconstruction process using the same previously encoded neighboring pixels. If not, the intra prediction mode is parsed from the bitstream as in classical intra coding mode.

To derive the intra prediction mode for a block, we must first select a set of neighboring pixels on which we will perform a gradient analysis. For normativity purposes, these pixels should be in the decoded/reconstructed pool of pixels. We choose, as shown in FIG. 7, a template surrounding the current block by T pixels to the left, and T pixels above. Next, we perform a gradient analysis on the pixels of the template. This allows to determine a main angular direction for the template, which we assume (and that is the core premise of our method) has a high chance to be identical to the one of the current blocks. We thus use a simple 3×3 Sobel gradient filter, defined by the following matrices that will be convoluted with the template:

$$M_x = \begin{bmatrix} -1 & 0 & 1 \\ -2 & 0 & 2 \\ -1 & 0 & 1 \end{bmatrix} \text{ and } M_y = \begin{bmatrix} -1 & -2 & -1 \\ 0 & 0 & 0 \\ 1 & 2 & 1 \end{bmatrix}$$

For each pixel of the template, we point-by-point multiply each of these two matrices with the 3×3 window centered around the current pixel and composed of its 8 direct neighbors, and sum the result. Thus, we obtain two values Gx (from the multiplication with Mx), and Gy (from the multiplication with My) corresponding to the gradient at the current pixel, in the horizontal and vertical direction respectively.

FIG. 8 shows the convolution process. The pixel 910 is the current pixel. The pixels with possible gradient analysis (including the current pixel) are pixels on which the gradient analysis is possible. FIG. 8 further shows the pixels on which the gradient analysis is not possible due to lack of some neighbors. Outside pixels are available (reconstructed) pixels outside of the considered template, used in the gradient analysis of the pixels with possible gradient analysis. In case an outside pixel is not available (due to blocks being too close to the border of the picture for instance), the gradient analysis of all pixels with possible gradient analysis that use this outside pixel is not performed. For each pixel with possible gradient analysis, we compute the intensity (G) and the orientation (O) of the gradient using Gx and Gy as such:

$$G = |G_x| + |G_y| \text{ and } 0 = a\tan\left(\frac{G_y}{G_x}\right)$$

The orientation of the gradient is then converted into an intra angular prediction mode, used to index a histogram (first initialized to zero). The histogram value at that intra angular mode is increased by G. Once all the pixels with possible gradient analysis in the template have been processed, the histogram will contain cumulative values of gradient intensities, for each intra angular mode. The IPMs corresponding to two tallest histogram bars are selected for the current block. If the maximum value in the histogram is 0 (meaning no gradient analysis was able to be made, or the area composing the template is flat), then the DC mode is selected as intra prediction mode for the current block.

Figure 9:
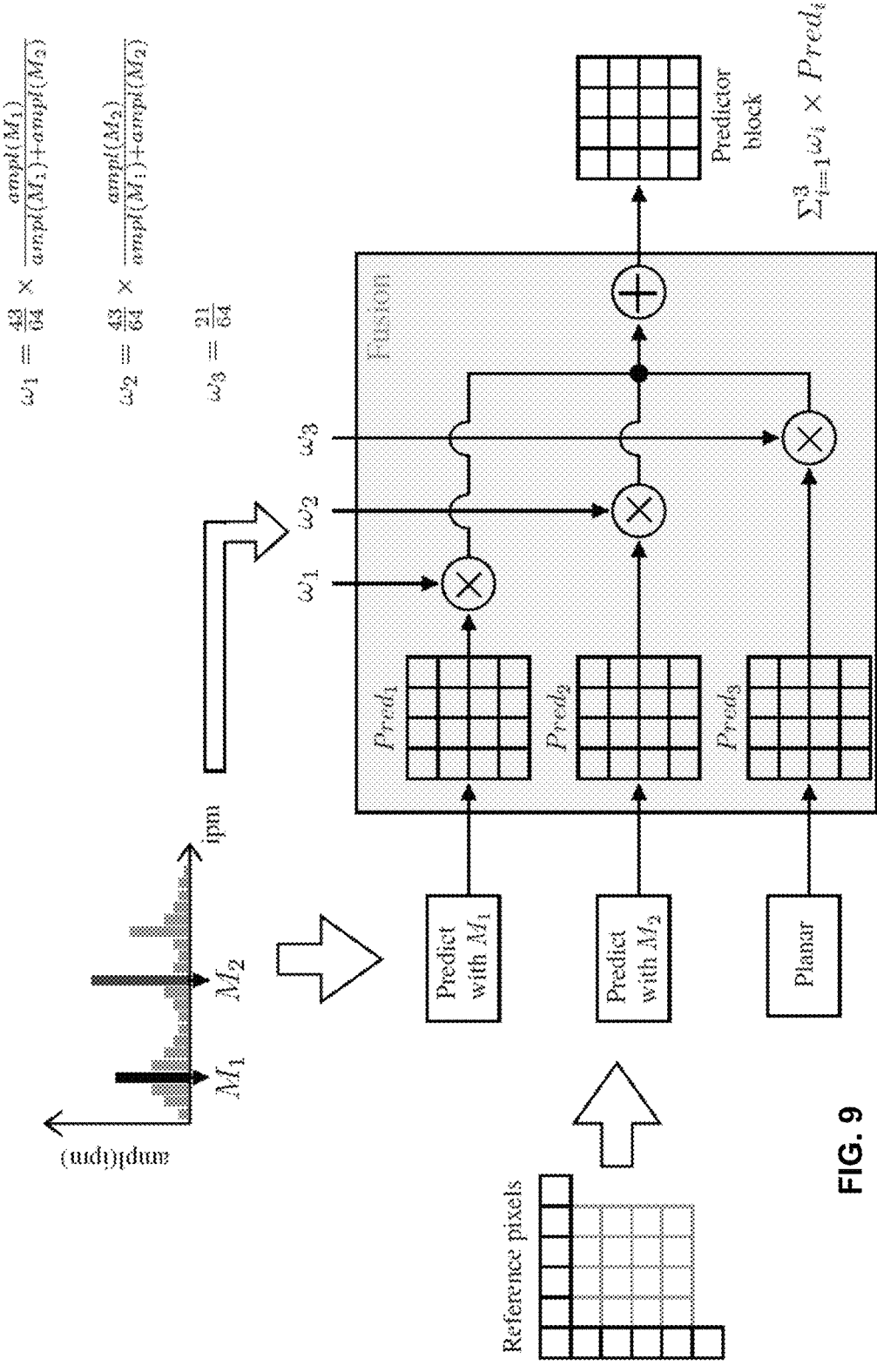
FIG. 9 illustrates prediction fusion by weighted averaging of two HoG mode and one planar mode in accordance with some implementations of the present disclosure.

The two IPMs corresponding to two tallest HoG bars are combined with the Planar mode. In one or more examples, the prediction fusion is applied as a weighted average of the above three predictors. To this aim, the weight of planar is fixed to 21/64 (~⅓). The remaining weight of 43/64 (~⅔) is then shared between the two HoG IPMs, proportionally to the amplitude of their HoG bars. FIG. 9 visualizes this process.

Derived intra modes are included into the primary list of intra most probable modes (MPM), so the DIMD process is performed before the MPM list is constructed. The primary derived intra mode of a DIMD block is stored with a block and is used for MPM list construction of the neighboring blocks.

Template-Based Intra Mode Derivation (TIMD)

Figure 10:
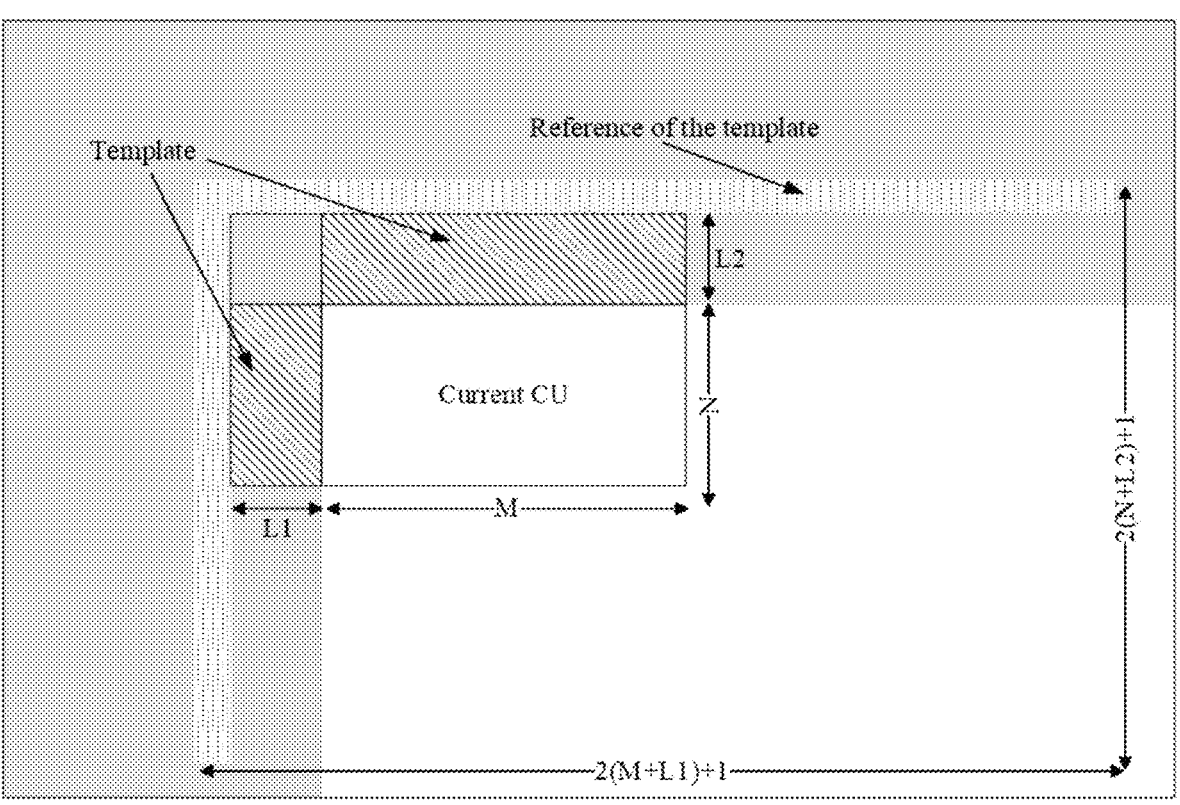
FIG. 10 illustrates template and its reference samples used om TIMD in accordance with some implementations of the present disclosure.

For each intra mode in MPMs, the sum of absolute transformed differences (SATD) between prediction and reconstruction samples of the template region shown in FIG. 10 is computed and the intra modes with the first two modes with the smallest SATD cost are chosen and then fuse them with the weights, and such weighted intra prediction is used to code the current CU.

The costs of the two selected modes are compared with a threshold, in the test the cost factor of 2 is applied as follows:

costMode2<2*costMode1.

If this condition is true, the fusion is applied, otherwise the only model is used.

Weights of the modes are computed from their SATD costs as follows:

$$weight\ 1 = costMode2/(costMode1 + costMode2)$$
$$weight\ 2 = 1 - weight\ 1$$

Although the DIMD mode can enhance the intra prediction efficiency, there is room to further improve its performance. Meanwhile, some parts of the existing DIMD mode also need to be simplified for efficient codec hardware implementations or improved for better coding efficiency. Furthermore, the tradeoff between its implementation complexity and its coding efficiency benefit needs to be further improved.

Figure 11A:
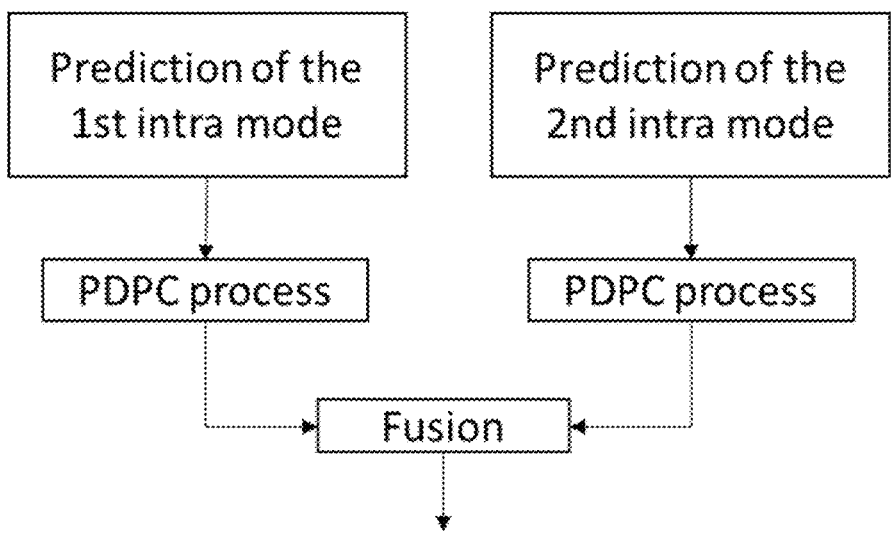
FIG. 11A is a block diagram showing a video decoding process with TIMD in accordance with some implementations of the present disclosure.
Figure 11B:
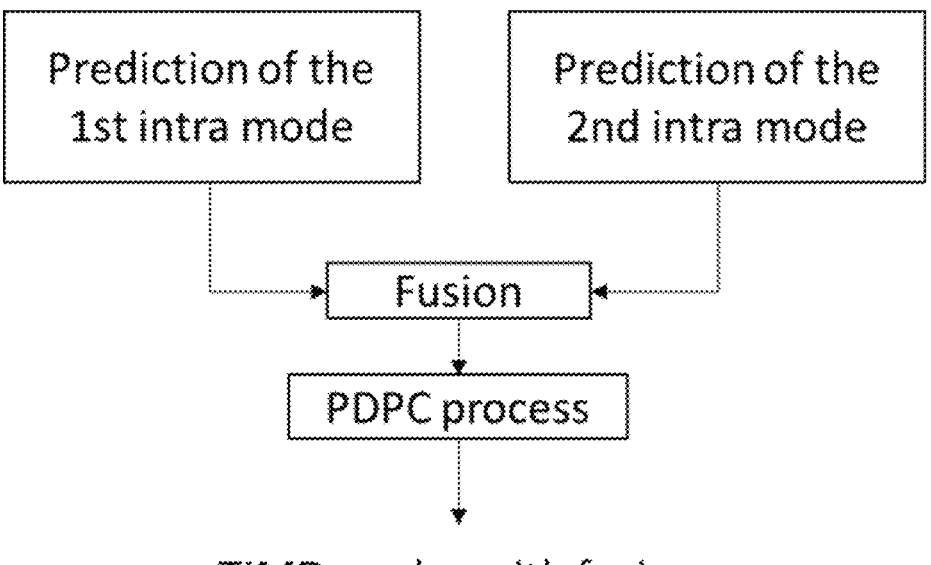
FIG. 11B is a block diagram showing a video decoding process with TIMD in accordance with some implementations of the present disclosure.
Figure 11C:
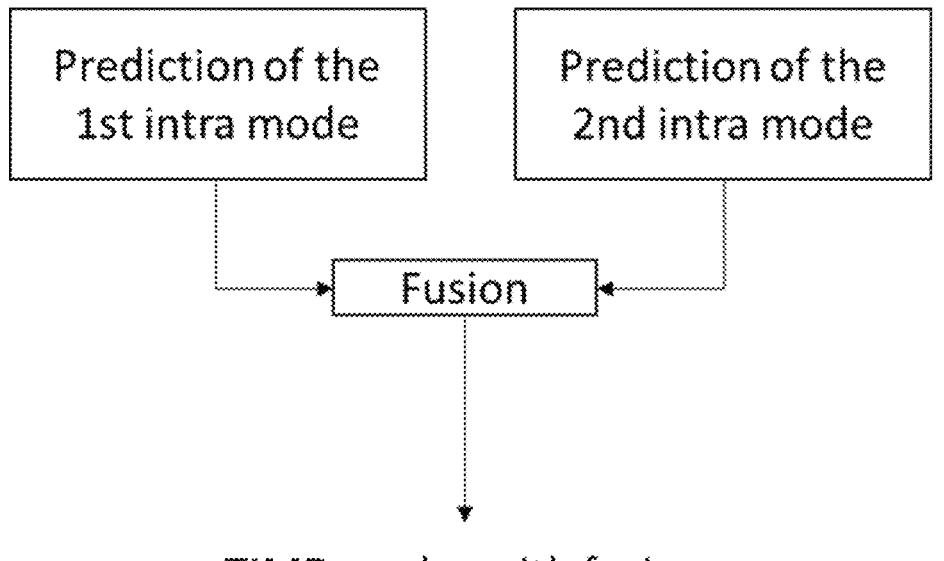
FIG. 11C is a block diagram showing a video decoding process with TIMD in accordance with some implementations of the present disclosure.
Figure 11D:
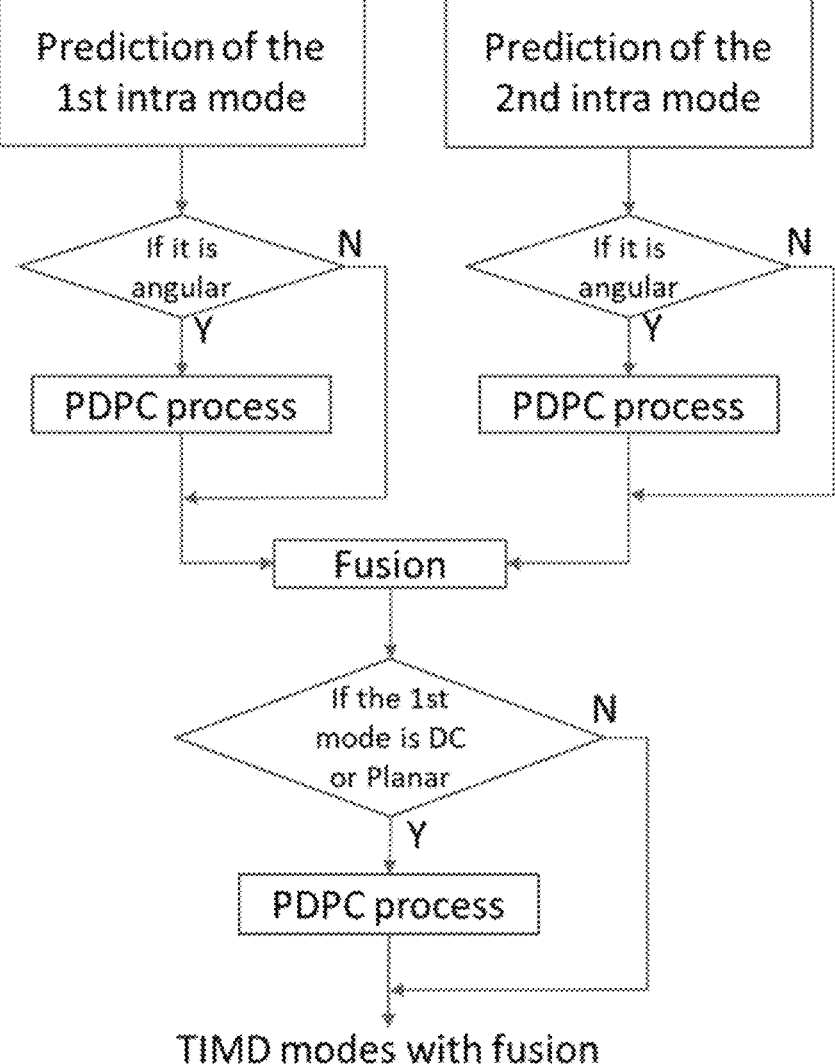
FIG. 11D is a block diagram showing a video decoding process with TIMD in accordance with some implementations of the present disclosure.

After the finalization of VVC, the JVET group continued exploring the compression efficiency beyond VVC. One reference software called enhanced compression model (ECM) was maintained by the JVET by integrating several additional coding tools on top of the VVC test model (VTM). In current ECM, PDPC is used dependent on intra mode. For DIMD mode, PDPC is used dependent on each intra mode. Two different positions of PDPC scheme are used and applied to each intra mode in DIMD mode, as shown in FIG. 11D. For intra predictions where the angular mode is used in DIMD mode, the PDPC is applied before prediction fusion. For intra predictions where the DC or planar mode is used in DIMD mode, the PDPC is applied after prediction fusion. Such non-unified design may not be optimal from standardization point of view.

Similarly, two different designs of fusion scheme are available and applied to DIMD and TIMD, respectively. Each different fusion design is associated with different candidates and weight calculations. For blocks where the DIMD is applied, the two IPMs corresponding to two tallest HoG bars and planar mode are selected for fusion. And the weight of planar is fixed to $21/64$ ($\sim 1/3$). The remaining weight of $43/64$ ($\sim 2/3$) is then shared between the two HoG IPMs, proportionally to the amplitude of their HoG bars. For blocks where TIMD is applied, the intra modes with the first two modes with the smallest SATD cost are chosen and the weights of the modes are computed from their SATD costs. Such non-unified designs may not be optimal from standardization point of view. Besides the above, there is room to further improve its performance by different fusion schemes.

In current ECM design, derived intra modes from DIMD are included into the primary list of intra most probable modes (MPM), regardless of whether the derived intra mode is already used in DIMD. There is room to further improve its performance.

In the existing designs of the DIMD and the TIMD, multiple floating-point operations (including additions, multiplications and divisions) are involved to calculate the parameters used for the derivation of the optimal intra prediction mode and the generation of the corresponding prediction samples of one current DIMD/TIMD coding block. Specifically, the following floating-point operations are applied in the existing DIMD and TIMD designs in the ECM:

1) The derivation of the gradient orientations in the DIMD: As described earlier, in the DIMD mode, two optimal intra prediction modes are selected based on the analysis of the histogram of the gradients (HoGs) for the neighboring reconstructed samples (i.e., template) above and left to the current block. During such analysis, the gradient orientation of each template sample needs to be calculated which is further converted to one of the existing angular intra prediction directions. In the ECM, a pair of floating-point division and multiplication are applied at each template sample to calculate such orientation based on its horizontal and vertical gradients, i.e., $$Orient = \frac{G_y}{G_x} \cdot 2^{16}.$$

2) The blending of prediction samples in the DIMD: In the existing DIMD design, the prediction samples generated using the two angular intra prediction modes with the largest and the second largest gradient histogram amplitudes are blended with that of the planar mode to form the final prediction samples of the current block. Furthermore, the weights of the two angular intra predictions are determined based on the histogram amplitudes of their gradients, where one group of floating-point addition, multiplication, and division are introduced, as described as:

$$w_1 = \frac{2}{3} \cdot \frac{Amp_1}{(Amp_1 + Amp_2)}$$
$$w_2 = \frac{2}{3} - w_1$$

3) The blending of the prediction samples in the TIMD: In the existing TIMD design, when the SATD of two selected intra modes are close enough, the prediction samples generated from two intra modes are blended together to generate the final prediction samples of the current block. As per the current design, the weights applied to two intra modes are calculated according to their respective SATD values, where one couple of floating-point multiplication and division are involved, as depicted as $$w_1 = \frac{SATD_2}{(SATD_1 + SATD_2)}$$
$$w_2 = 1 - w_1$$

All of those above floating-point operations are very expensive for the practical codec implementations in both hardware and software.

In this disclosure, to address the issues as pointed out previously, methods are provided to simplify and/or further improve the existing design of the DIMD mode. In general, the main features of the proposed technologies in this disclosure are summarized as follows.

1). Unify the PDPC used under angular mode and DC/planar mode in DIMD mode, by applying the PDPC for all intra prediction before prediction fusion. One example of such method is shown in a block diagram as in FIG. 12A.

2). Unify the PDPC used under angular mode and DC/planar mode in DIMD mode, by applying the PDPC for all intra prediction after prediction fusion. One example of such method is shown in a block diagram as in FIG. 12B.

3). Unify the PDPC used under angular mode and DC/planar mode in DIMD mode, by disabling the PDPC for all intra predictions in DIMD mode. One example of such method is shown in a block diagram as in FIG. 12C.

Figures 11E, 11F:
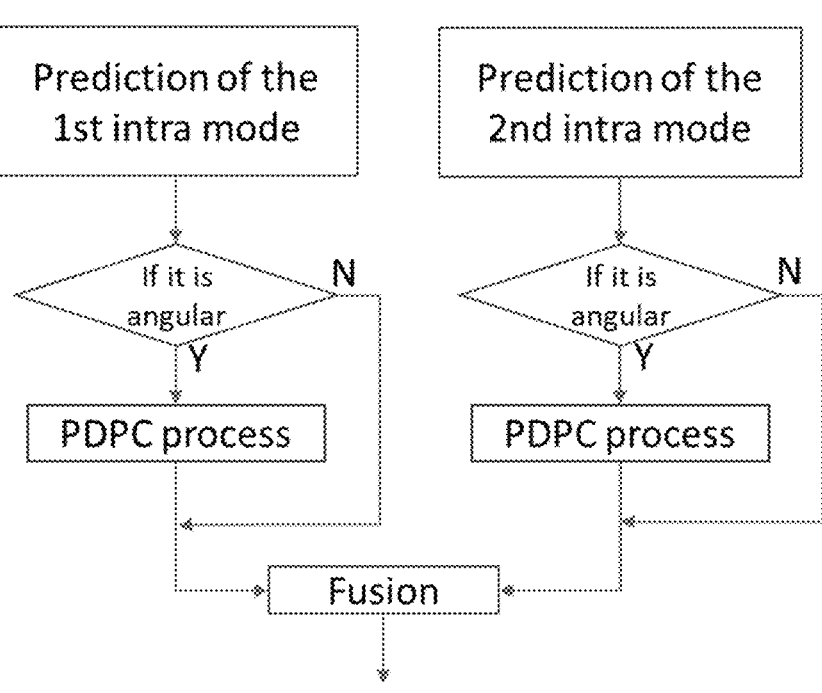
FIG. 11E is a block diagram showing a video coding process with TIMD in accordance with some implementations of the present disclosure.
FIG. 11F is a block diagram showing a video coding process with TIMD in accordance with some implementations of the present disclosure.

4). Unify the PDPC used under angular mode and DC/planar mode in TIMD or DIMD mode, by disabling the PDPC for DC/planar intra predictions in TIMD or DIMD mode. For example, in response to determining that a DC or planar mode is applied, the encoder or decoder may disable PDPC for the DC or planar mode after fusion in TIMD as shown in FIG. 11E. In another example, in response to determining that a DC or planar mode is applied, the encoder or decoder may disable PDPC for the DC or planar mode before fusion in DIMD as shown in FIG. 12C. In another example, in response to determining that a planar mode is applied in the first and second intra prediction modes in FIG. 12D, the encoder or decoder may disable the PDPC for the planar intra predictions before fusion in the DIMD mode.

5). Unify the PDPC used under angular mode and DC/planar mode in TIMD or DIMD mode, by disabling the PDPC for angular intra predictions in TIMD or DIMD mode. For example, in response to determining that an angular mode is applied in the first and second intra prediction modes, the encoder or decoder may disable the PDPC for the angular intra predictions before fusion in the DIMD mode as shown in FIG. 12C. In another example, in response to determining that an angular mode is applied, the encoder or decoder disables PDPC for angular intra predictions before fusion in TIMD as shown in FIG. 11F.

6). Unify the fusion scheme used under DIMD mode and TIMD mode, by applying the fusion scheme used under DIMD mode to TIMD mode.

7). Unify the fusion scheme used under DIMD mode and TIMD mode, by applying the fusion scheme used under TIMD mode to DIMD mode.

8). Unify the fusion scheme used under DIMD mode and TIMD mode, by signaling the selection of fusion scheme.

9). Derive intra modes from DIMD into the list of intra most probable modes (MPM), regard of whether the derived intra mode is already used in DIMD.

10). Derive intra modes from TIMD into the list of intra most probable modes (MPM).

It is noted that proposed methods can also be applied on other intra prediction coding modes, such as TIMD/MDIP by an encoder or a decoder. Another set of examples applied in TIMD mode is illustrated in the block diagrams of FIGS. 11A-11C. FIG. 11A illustrates an example of applying all PDPC processes before the fusion process of the TIMD. FIG. 11B illustrates an example of applying all PDPC processes after the fusion process of the TIMD. FIG. 11C illustrates an example of disabling all PDPC processes in the TIMD.

It is noted that proposed methods can also be applied on other combined intra and inter prediction coding modes, such as combined inter and intra prediction (CIIP).

It is noted that the disclosed methods may be applied independently or jointly.

Harmonization of the PDPC used for angular mode and DC/planar mode in DIMD

According to one or more embodiments of the disclosure, a same PDPC position is applied to both the angular modes and the DC/planar modes under DIMD mode. Different methods may be used to achieve this goal.

Figure 12A:
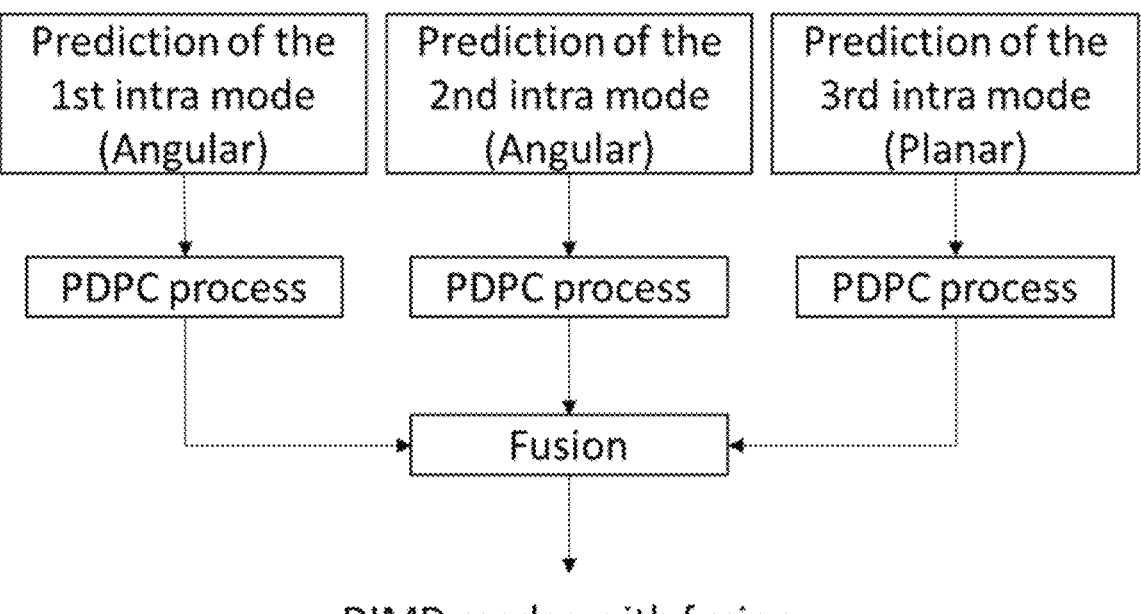
FIG. 12A is a block diagram showing a video decoding process with DIMD in accordance with some implementations of the present disclosure.

In one example of the present disclosure, it is proposed to apply the PDPC operations before prediction fusion in DIMD mode, as illustrated in FIG. 12A. In other words, each intra prediction modes are applied PDPC based on its intra mode before prediction fusion in DIMD mode. The proposed methods can also be applied on other intra prediction coding modes, such as TIMD.

Figure 12B:
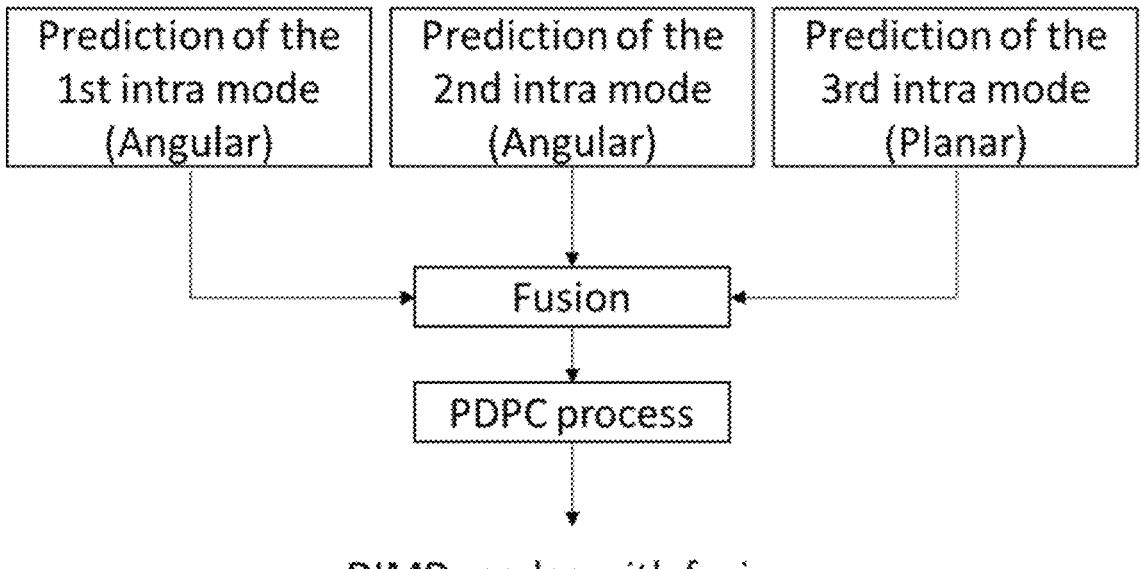
FIG. 12B is a block diagram showing a video decoding process with DIMD in accordance with some implementations of the present disclosure.
Figure 12C:
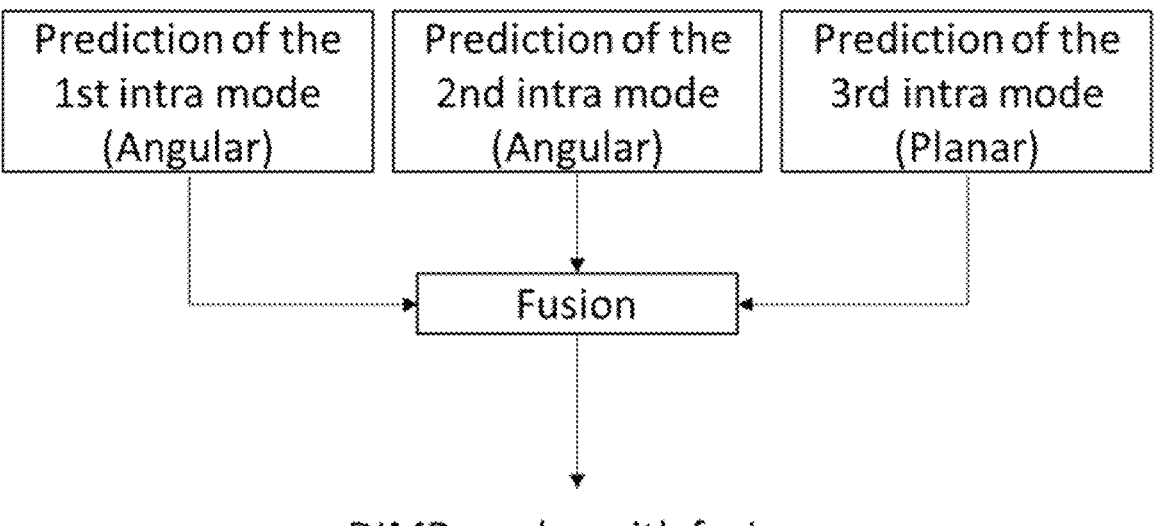
FIG. 12C is a block diagram showing a video decoding process with DIMD in accordance with some implementations of the present disclosure.
Figure 12D:
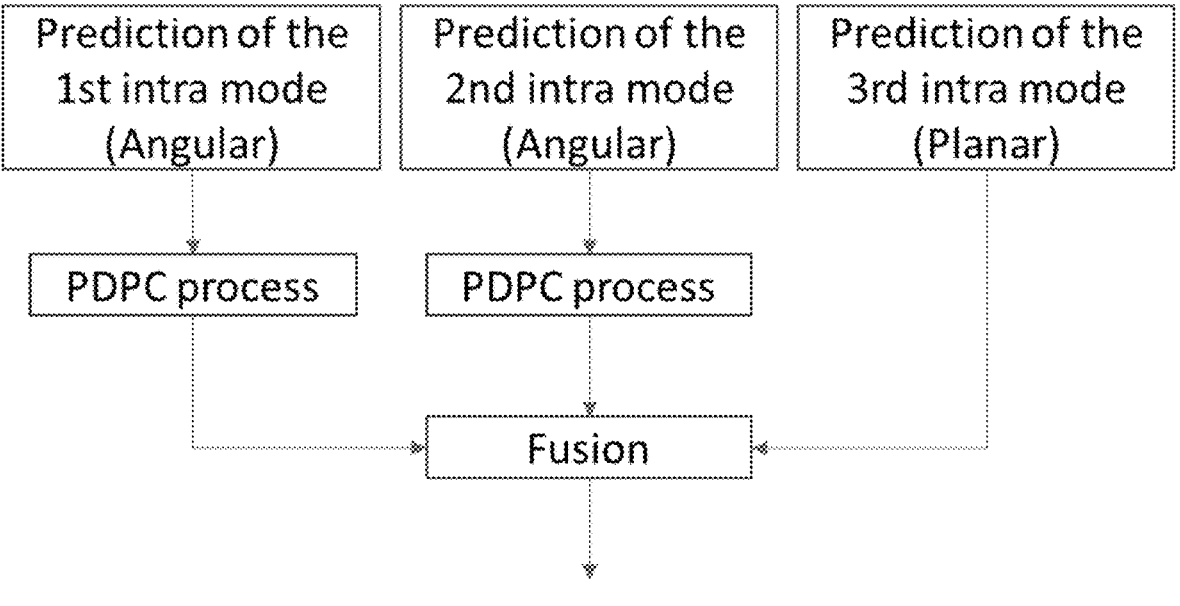
FIG. 12D is a block diagram showing a video coding process with DIMD in accordance with some implementations of the present disclosure.

In another example of the present disclosure, it is proposed to apply the PDPC operations after prediction fusion in DIMD mode, as illustrated in FIG. 12B. In other words, a weighted combination of the three predictors is applied PDPC based on specific mode, e.g., DC, Planar. In one example, the specific mode is planar mode then PDPC with planar mode is applied after prediction fusion in DIMD mode. In another example, the IPMs corresponding to the tallest histogram bar is selected as the specific mode then PDPC with the specific mode is applied after prediction fusion in DIMD mode. In yet another example, the IPMs corresponding to the second tallest histogram bar is selected as the specific mode then PDPC with the specific mode is applied after prediction fusion in DIMD mode.

In another example of the present disclosure, it is proposed to disable the PDPC operations in DIMD mode. In other words, PDPC operations are not used in DIMD mode, as shown in FIG. 12C.

In another example of the present disclosure, it is proposed to disable the PDPC operations for DC/planar intra predictions in DIMD mode. In other words, PDPC operations are not used for DC/planar intra predictions in DIMD mode. In one example as illustrated in FIG. 15, in Step 1502, the encoder or decoder may determine prediction sample values of one or more video blocks based on position-dependent intra prediction combination (PDPC) operations for one or more intra predictions of the one or more video blocks to unify the PDPC operations in the intra prediction coding mode, wherein the PDPC operations modify results of the one or more intra predictions based on a combination of boundary reference samples. In Step 1504, in response to determining that a direct current (DC) mode or a planar mode is applied in the one or more intra predictions of the one or more video blocks, the encoder or decoder may disable the PDPC operations for the DC mode or the planar mode to unify the PDPC operations in the intra prediction coding mode.

In yet another example of the present disclosure, it is proposed to disable the PDPC operations for angular intra predictions in DIMD mode. In other words, PDPC operations are not used for angular intra predictions in DIMD mode. In one example as illustrated in FIG. 16, in Step 1602, the encoder or decoder may determine prediction sample values of one or more video blocks based on position-dependent intra prediction combination (PDPC) operations for one or more intra predictions of the one or more video blocks to unify the PDPC operations in the intra prediction coding mode, wherein the PDPC operations modify results of the one or more intra predictions based on a combination of boundary reference samples. In Step 1604, in response to determining that an angular mode is applied in the one or more intra predictions of the one or more video blocks, the encoder or decoder may disable the PDPC operations for the angular mode to unify the PDPC operations in the intra prediction coding mode.

It is noted that proposed methods can also be applied on other intra prediction coding modes, such as TIMD/MDIP.

Harmonization of the Fusion Scheme Used for DIMD Mode and TIMD Mode

According to one or more embodiments of the disclosure, a same fusion scheme is applied to both the DIMD mode and TIMD mode. Different methods may be used to achieve this goal. The fusion scheme is applied as a weighted average of predictors in the DIMD mode and in the TIMD mode.

In one example of the present disclosure, it is proposed to apply the fusion scheme used under DIMD mode to TIMD mode. In other words, for TIMD mode, the first two modes with the smallest SATD cost and planar mode are selected as the predictors for fusion, and the weighted average of the predictors is calculated. And the weight of planar is fixed to $^{21}/_{64}$ ($\sim\frac{1}{3}$). The remaining weight of $^{43}/_{64}$ ($\sim\frac{2}{3}$) is then shared between the other two modes, proportionally to the amplitude of their SATD costs.

In another example of the present disclosure, it is proposed to apply the fusion scheme used under TIMD mode to DIMD mode. In other words, for DIMD mode, the first two modes with the tallest HoG bars are selected as predictors for fusion and the weights of the modes are computed from HoG IPMs, proportionally to the amplitude of their HoG bars. If the maximum value in the histogram is 0 (meaning no gradient analysis was able to be made, or the area composing the template is flat), then one default mode is selected as intra prediction mode for the current block, e.g., DC, Planar.

In yet another example of the present disclosure, it is proposed to signal the selection of fusion scheme in TIMD and/or DIMD mode. In one example, for a given CU, a flag is signaled to decoder to indicate whether the block uses a DIMD mode or not. If it is coded using a DIMD mode, one flag is further signaled to the decoder to indicate which fusion scheme is used, e.g., as the above first fusion method or second fusion method.

Modify the DIMD Mode Used in the MPM List

In another aspect of this disclosure, it is proposed to derive intra modes from DIMD into the list of intra most probable modes (MPM), depending on whether the derived intra mode is already used in DIMD. According to one or more embodiments of the disclosure, if the fusion scheme is used in DIMD mode, the intra mode derived from DIMD may be used as a candidate for the MPM list. In other words, if the fusion scheme is not used in DIMD mode, the intra mode derived from DIMD cannot be used as a candidate for the MPM list.

In the other aspect of this disclosure, the directional modes with added offset from the available directional modes of DIMD may be used as candidates for the MPM list. In one specific example, offset may be 1, −1, 2, −2, 3, −3, 4, −4.

As shown in FIG. 17, in one example, the encoder or decoder may determine whether a fusion scheme is applied in the DIMD mode, wherein the fusion scheme is applied as a weighted average of predictors in the DIMD mode in Step 1702. In Step 1704, the encoder or decoder may apply an offset to an available directional mode in the DIMD mode to obtain an offset directional mode. In Step 1706, the decoder may determine whether to add the offset directional mode into a list of most probable modes (MPMs) based on whether the fusion scheme is applied in the DIMD mode.

For one example, a general MPM list with 22 entries is constructed first, and then the first 6 entries in this general MPM list are included into the primary MPM (PMPM) list, and the rest of entries form the secondary MPM (SMPM) list. The first entry in the general MPM list is the Planar mode. The remaining entries are composed of the intra modes of the left (L), above (A), below-left (BL), above-right (AR), and above-left (AL) neighboring blocks, DIMD modes (blue color part), the directional modes with added offset from the first two available directional modes of neighboring blocks and DIMD modes (red color part), and the default modes {DC_IDX(1), VER_IDX(50), HOR_IDX (18), VER_IDX-4(46), VER_IDX+4(54), 14, 22, 42, 58, 10, 26,38, 62, 6, 30, 34, 66, 2, 48, 52, 16}.

If a CU block is vertically oriented, the order of neighboring blocks is A, L, BL, AR, AL; otherwise, it is L, A, BL, AR, AL.

In this example, DIMD modes without offset (blue color part) is first added to MPM list. If the list is not full, then DIMD modes with offset (red color part) is added to MPM list.

TIMD Mode Used in the MPM List

In another aspect of this disclosure, it is proposed to derive intra modes from TIMD into the list of intra most probable modes (MPM). Generally, there are 67 intra prediction modes in VVC, including non-directional modes (Planar, DC) and 65 angular modes, which efficiently model different directional structures typically present in video and image contents. In one or more embodiments of the disclosure, the intra mode derived from TIMD may be used as a candidate for the MPM list. In one example, the intra mode derived from DIMD cannot be used as a candidate for the MPM list, the intra mode derived from TIMD may be used as a candidate for the MPM list.

In another aspect of this disclosure, it is proposed to derive intra modes from TIMD into the list of intra most probable modes (MPM), depending on whether the derived intra mode is already used in TIMD. According to one or more embodiments of the disclosure, if the fusion scheme is used in TIMD mode, the intra mode derived from TIMD may be used as a candidate for the MPM list. In other words, if the fusion scheme is not used in TIMD mode, the intra mode derived from TIMD cannot be used as a candidate for the MPM list.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above-described methods. Each module, sub-module, unit, or sub-unit disclosed above may be implemented at least partially using the one or more circuitries.

In some examples, the apparatus may include a processor 1620, and a memory 1630 configured to store instructions executable by the processor 1620. In some examples, the processor 1620, upon execution of the instructions, are configured to perform the methods as illustrated in FIGS. 15-16.

Simplified DIMD and TIMD with Integer Operations

As pointed out earlier, in the existing designs of the DIMD and the TIMD, a number of floating-point operations (i.e., additions, multiplications and divisions) are involved to derive the DIMD/TIMD parameters which are unacceptable for practical codec implementations in both software and hardware. In this section, one look-up-table (LUT)-based scheme is proposed to simplify the implementations of the DIMD and the TIMD by replacing all the floating-point operations with integer additions and multiplications. In one example, the decoder identifies a floating-point division operation to be performed to derive parameters in DIMD mode or in TIMD mode; and the decoder obtains the parameters in the DIMD or the TIMD by replacing the floating-point division operation with integer additions and multiplications based on a look-up-table (LUT).

Figure 13:
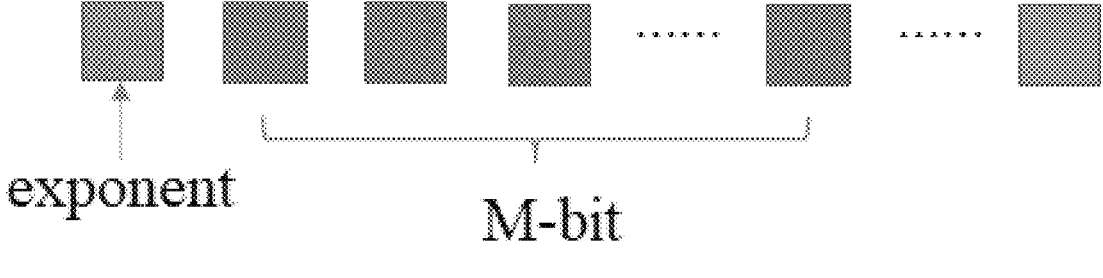
FIG. 13 illustrates the fractional bits used in the proposed integerization scheme in accordance with some implementations of the present disclosure.

Specifically, as shown in FIG. 13, it is proposed to approximate one integer L by one exponent and K-bit significant part (which contains K most significant bits (MSBs) after the exponent), as shown as $$L = 2^{exponent} \cdot \left(1 + \frac{norm_{MSB}}{2^K}\right)$$

where $norm_{MSB}$ is the value of the MSBs which ranges from 0 to $2^K - 1$. Correspondingly, the division by the integer L can be written as:

$$\frac{1}{L} = 2^{-exponent} \cdot \frac{1}{\left(1 + \frac{norm_{MSB}}{2^K}\right)}$$

If the fractional part of the 1/L is quantized with M-bit precision, the above equation become $$\frac{2^M}{L} = 2^{-exponent} \cdot \left\langle \frac{2^M}{\left(1 + \frac{norm_{MSB}}{2^K}\right)} \right\rangle$$

where $\langle \cdot \rangle$ is rounding operation. Further, the rounding part of the above equation can be represented by one LUT which contains 2K elements and each element is represented in M-bit precision. On the other hand, because the value of $norm_{MSB}$ is in the range of [0, $2^K - 1$], the rounding part is always no smaller than 2-1. Given such prior knowledge, the LUT size can be reduced by ignoring the first MSB (which is always equal to 1) of each element and only storing its rest (M−1)-bit least significant bits (LSBs), i.e., each element only needs (M−1)-bit. Based on such design, the elements of the LUT can be calculated as:

$$divLut[norm_{MSB}] = \left\langle \frac{2^{shift}}{\left(1 + \frac{norm_{MSB}}{2^K}\right)} \right\rangle - 2^{M-1}$$

where $$shift = \begin{cases} M - 1, & norm_{MSB} = 0 \\ M, & norm_{MSB} > 0 \end{cases}$$

Correspondingly, the proposed integerization scheme can be achieved where the division between any two integers, e.g., $$ratio = \frac{num}{denom},$$

can be replaced by one LUT-based integer multiplication plus one right shift, as depicted as $$exponent = Floor(Log2(denom))$$

$$norm_{MSB} = ((denom \ll K) \gg exponent) \,\&((1 \ll K) - 1)$$

$$s = exponent + shift$$

-continued $$add = (1 \ll (s - 1))$$

$$ratio = (num \cdot (divLut[norm_{MSB}](1 \ll (M - 1))) + add) \gg s$$

where num represents the value of the numerator, and denom represents the value of the denominator. In an example of the present disclosure, the denominator is of the integer value L, and the numerator is 1.

In practice, different combination of LUT size (i.e., K) and parameter precision (i.e., M) may be applied to achieve varying tradeoff between the accuracy of the derived parameters and the implementation complexity. For example, using large LUT size and higher parameter precision is beneficial to keep high parameter accuracy which however comes along with the expense on enlarged storage size to maintain the LUT and increased bit-depth to conduct the corresponding integer operations (e.g., integer multiplications, additions and bit-wise shifts). Based on such consideration, in one specific example, it is proposed to set the values of K and M to 4. Based on such setting, the corresponding LUT is derived as $$divLut[] = \{0, 7, 6, 5, 5, 4, 4, 3, 3, 2, 2, 1, 1, 1, 0\}$$

Using the DIMD derivation as example, when the above integerization scheme (when both K and M are set to 4), the derivation of the gradient orientation at each template sample can be implemented as $$exponent = Floor(Log2(G_x))$$

$$norm_{MSB} = ((G_x \ll 4) \gg exponent) \,\&15$$

$$v = G_y \cdot (divLut[norm_{MSB}]|8)$$

$$s = exponent + (norm_{MSB} \neq 0?4:3) - 16$$

$$orient = \begin{cases} (G_y \cdot v) \ll (-s), & s \leq 0 \\ ((G_y \cdot v) + (1 \ll (s - 1))) \gg s, & s > 0 \end{cases}$$

Note that the values of K and M used in the above example are just used for the illustration purpose. In practice, the proposed LUT-based scheme using different values of K and M may be applied to convert any float-point divisions into integer operations in the process of other future coding techniques.

Figure 14:
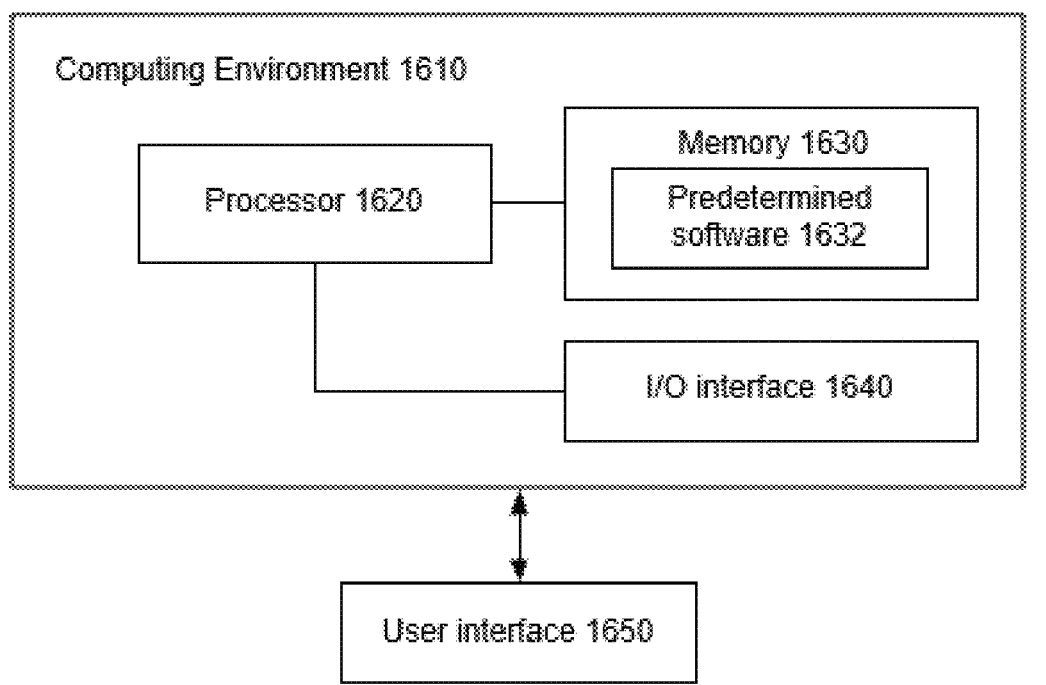
FIG. 14 is a block diagram illustrating a computing environment coupled with a user interface in accordance with some implementations of the present disclosure.

FIG. 14 shows a computing environment 1610 coupled with a user interface 1650. The computing environment 1610 may be part of a data processing server. The computing environment 1610 includes a processor 1620, a memory 1630, and an Input/Output (I/O) interface 1640.

The processor 1620 typically controls overall operations of the computing environment 1610, such as the operations associated with display, data acquisition, data communications, and image processing. The processor 1620 may include one or more processors to execute instructions to perform all or some of the steps in the above-described methods. Moreover, the processor 1620 may include one or more modules that facilitate the interaction between the processor 1620 and other components. The processor may be a Central Processing Unit (CPU), a microprocessor, a single chip machine, a Graphical Processing Unit (GPU), or the like.

The memory 1630 is configured to store various types of data to support the operation of the computing environment

1610. The memory 1630 may include predetermined software 1632. Examples of such data includes instructions for any applications or methods operated on the computing environment 1610, video datasets, image data, etc. The memory 1630 may be implemented by using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The I/O interface 1640 provides an interface between the processor 1620 and peripheral interface modules, such as a keyboard, a click wheel, buttons, and the like. The buttons may include but are not limited to, a home button, a start scan button, and a stop scan button. The I/O interface 1640 may be coupled with an encoder and decoder.

In an embodiment, there is also provided a non-transitory computer-readable storage medium comprising a plurality of programs, for example, in the memory 1630, executable by the processor 1620 in the computing environment 1610, for performing the above-described methods. Alternatively, the non-transitory computer-readable storage medium may have stored therein a bitstream or a data stream comprising encoded video information (for example, video information comprising one or more syntax elements) generated by an encoder (for example, the video encoder 20 in FIG. 2) using, for example, the encoding method described above for use by a decoder (for example, the video decoder 30 in FIG. 3) in decoding video data. The non-transitory computer-readable storage medium may be, for example, a ROM, a Random Access Memory (RAM), a CD-ROM, a magnetic tape, a floppy disc, an optical data storage device or the like. In some examples, the non-transitory computer-readable storage medium may store a bitstream to be decoded by decoding methods as illustrated in FIGS. 15-16.

In an embodiment, the is also provided a computing device comprising one or more processors (for example, the processor 1620); and the non-transitory computer-readable storage medium or the memory 1630 having stored therein a plurality of programs executable by the one or more processors, wherein the one or more processors, upon execution of the plurality of programs, are configured to perform the above-described methods.

In an embodiment, there is also provided a computer program product comprising a plurality of programs, for example, in the memory 1630, executable by the processor 1620 in the computing environment 1610, for performing the above-described methods. For example, the computer program product may include the non-transitory computer-readable storage medium.

In an embodiment, the computing environment 1610 may be implemented with one or more ASICs, DSPs, Digital Signal Processing Devices (DSPDs), Programmable Logic Devices (PLDs), FPGAs, GPUs, controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video decoding, comprising:
   determining, by a decoder, an intra prediction coding mode with a fusion of multiple intra predictions of a video block is applied to the video block; and
   determining, by the decoder, prediction sample values of the video block based on position-dependent intra prediction combination (PDPC) operations for one or more intra predictions among the multiple intra predictions, wherein the PDPC operations modify results of the one or more intra predictions based on a combination of boundary reference samples,
   wherein
   in response to determining that a direct current (DC) mode or a planar mode is applied in the multiple intra predictions, disabling, by the decoder, the PDPC operations for the DC mode or the planar mode; or
   in response to determining that an angular mode is applied in the multiple intra predictions, disabling, by the decoder, the PDPC operations for the angular mode.

2. The method for video decoding of claim 1, wherein the intra prediction coding mode comprises a template-based intra mode derivation (TIMD) mode, a decoder-side intra mode derivation (DIMD) mode, or a multi-direction intra prediction (MDIP) mode.

3. The method for video decoding of claim 2, wherein the decoder disables the PDPC operations for the DC mode or the planar mode after the fusion in the TIMD mode.

4. The method for video decoding of claim 2, wherein the decoder disables the PDPC operations for the planar mode before the fusion in the DIMD mode.

5. The method for video decoding of claim 2, wherein the decoder disables the PDPC operations for the angular mode before the fusion in the DIMD mode.

6. An apparatus, comprising:
   one or more processors; and
   a memory configured to store instructions executable by the one or more processors;
   wherein the one or more processors, upon execution of the instructions, are configured to:
   determine an intra prediction coding mode with a fusion of multiple intra predictions of a video block is applied to the video block; and
   determine prediction sample values of the video block based on position-dependent intra prediction combination (PDPC) operations for one or more intra predictions among the multiple intra predictions, wherein the PDPC operations modify results of the one or more intra predictions based on a combination of boundary reference samples, wherein in response to determining that a direct current (DC) mode or a planar mode is applied in the multiple intra predictions, disable the PDPC operations for the DC mode or the planar mode; or in response to determining that an angular mode is applied in the multiple intra predictions, disable the PDPC operations for the angular mode.

7. The apparatus of claim 6, wherein the intra prediction coding mode comprises a template-based intra mode derivation (TIMD) mode, a decoder-side intra mode derivation (DIMD) mode, or a multi-direction intra prediction (MDIP) mode.

8. The apparatus of claim 7, wherein the one or more processors, upon execution of the instructions, are further configured to: disable the PDPC operations for the DC mode or the planar mode after the fusion in the TIMD mode.

9. The apparatus of claim 7, wherein the one or more processors, upon execution of the instructions, are further configured to: disable the PDPC operations for the planar mode before the fusion in the DIMD mode.

10. The apparatus of claim 7, wherein the one or more processors, upon execution of the instructions, are further configured to: disable the PDPC operations for the angular mode before the fusion in the DIMD mode.

11. A non-transitory computer-readable storage medium storing a bitstream to be decoded by a decoding method comprising:

determining an intra prediction coding mode with a fusion of multiple intra predictions of a video block is applied to the video block; and determining prediction sample values of the video block based on position-dependent intra prediction combination (PDPC) operations for one or more intra predictions among the multiple intra predictions, wherein the PDPC operations modify results of the one or more intra predictions based on a combination of boundary reference samples, wherein in response to determining that a direct current (DC) mode or a planar mode is applied in the multiple intra predictions, disabling the PDPC operations for the DC mode or the planar mode; or in response to determining that an angular mode is applied in the multiple intra predictions, disabling the PDPC operations for the angular mode.

12. The non-transitory computer-readable storage medium of claim 11, wherein the intra prediction coding mode comprises a template-based intra mode derivation (TIMD) mode, a decoder-side intra mode derivation (DIMD) mode, or a multi-direction intra prediction (MDIP) mode.

13. The non-transitory computer-readable storage medium of claim 12, wherein the decoding method further comprises: disabling the PDPC operations for the DC mode or the planar mode after the fusion in the TIMD mode.

14. The non-transitory computer-readable storage medium of claim 12, wherein the decoding method further comprises: disabling the PDPC operations for the planar mode before the fusion in the DIMD mode.

15. The non-transitory computer-readable storage medium of claim 12, wherein the decoding method further comprises: disabling the PDPC operations for the angular mode before the fusion in the DIMD mode.

* * * * *